US011888396B2

(12) United States Patent
Hagiwara

(10) Patent No.: US 11,888,396 B2
(45) Date of Patent: Jan. 30, 2024

(54) CHOPPER CIRCUIT

(71) Applicant: TOKYO INSTITUTE OF TECHNOLOGY, Tokyo (JP)

(72) Inventor: Makoto Hagiwara, Tokyo (JP)

(73) Assignee: TOKYO INSTITUTE OF TECHNOLOGY, Tokyo (JP)

( * ) Notice: Subject to any disclaimer, the term of this patent is extended or adjusted under 35 U.S.C. 154(b) by 428 days.

(21) Appl. No.: 17/285,875

(22) PCT Filed: Oct. 16, 2019

(86) PCT No.: PCT/JP2019/040752
§ 371 (c)(1),
(2) Date: Apr. 15, 2021

(87) PCT Pub. No.: WO2020/085172
PCT Pub. Date: Apr. 30, 2020

(65) Prior Publication Data
US 2021/0351699 A1 Nov. 11, 2021

(30) Foreign Application Priority Data
Oct. 23, 2018 (JP) ................................. 2018-199400

(51) Int. Cl.
*H02M 3/158* (2006.01)
*H02M 1/00* (2006.01)
*H02M 1/088* (2006.01)

(52) U.S. Cl.
CPC ........... *H02M 3/158* (2013.01); *H02M 1/007* (2021.05); *H02M 1/088* (2013.01)

(58) Field of Classification Search
CPC ....... H02M 3/158; H02M 1/007; H02M 1/088
See application file for complete search history.

(56) References Cited

U.S. PATENT DOCUMENTS 6,002,603 A    12/1999  Carver
10,498,233 B2 * 12/2019 Akagi ..................... H02M 1/14
(Continued)

FOREIGN PATENT DOCUMENTS

CN   102340241      2/2012
JP   2010-213506 A  9/2010
(Continued)

OTHER PUBLICATIONS

European Application No. 19876152.0, Extended European Search Report, dated Jun. 23, 2022, 12 pages.
(Continued)

*Primary Examiner* — Kyle J Moody
(74) *Attorney, Agent, or Firm* — KILPATRICK TOWNSEND & STOCKTON LLP

(57) ABSTRACT

This chopper circuit 1 performs voltage conversion between a first DC voltage at a first external connection terminal and a second DC voltage at a second external connection terminal and is provided with: a first switch portion 11 having the first external connection terminal; a second switch portion 12 connected in series with the first switch portion 11 so that the conducting direction during ON-time matches that of the first switch portion 11 and having the second external connection terminal on the opposite side to the side where the first switch portion 11 is connected; one or a plurality of semiconductor power converters 13 cascade-connected to each other, which are provided on a wire branched from the wire for connecting the first switch portion 11 and the second switch portion 12; and an inductor 14 connected in series with the semiconductor power converters 13 on the wire branched from the wire for connecting the first switch portion 11 and the second switch portion 12.

10 Claims, 25 Drawing Sheets

(56) References Cited

U.S. PATENT DOCUMENTS

| | | | |
|---|---|---|---|
| 2012/0112669 A1 | 5/2012 | Kitanaka | |
| 2018/0026518 A1* | 1/2018 | Liu | H02M 3/158 323/312 |
| 2018/0254699 A1 | 9/2018 | Akagi et al. | |

FOREIGN PATENT DOCUMENTS

| | | | |
|---|---|---|---|
| JP | 2016-226127 A | 12/2016 | |
| WO | 2011/021443 A1 | 2/2011 | |
| WO | 2016/029824 | 3/2016 | |
| WO | 2017/038122 A1 | 3/2017 | |

OTHER PUBLICATIONS

Yang et al., "The Hybrid-Cascaded DC-DC Converters Suitable for HVdc Applications," Institute of Electrical and Electronics Engineers Transactions on Power Electronics, vol. 30, No. 10, Oct. 1, 2015, pp. 5358-5363.

PCT Application No. PCT/JP2019/040752, International Preliminary Report on Patentability, dated Oct. 16, 202, 7 pages (with English translation).

ISA/Japan Patent Office; International Search Report of PCT/JP2019/040752; dated Dec. 24, 2019.

* cited by examiner (A)

CIRCUIT CONSTANTS USED FOR SIMULATION

| RATED POWER | $P_{dc1}$, $P_{dc2}$ | 400 kW |
|---|---|---|
| FIRST DC VOLTAGE | $v_{dc1}$ | 1.5 kV |
| SECOND DC VOLTAGE | $v_{dc2}$ | 0.75 kV |
| INDUCTANCE | L | 0.3 mH |
| ELECTROSTATIC CAPACITANCE | C | 3.3 mF |
| DC CAPACITOR VOLTAGE | $v_C$ | 600 V |
| NUMBER OF UNITS | M | 3 |
| NUMBER OF CHOPPER CELLS FOR EACH UNIT | N | 3 |
| CARRIER FREQUENCY OF MAIN POWER CONVERTER | $f_{SM}$ | 450 Hz |
| CARRIER FREQUENCY OF AUXILIARY POWER CONVERTER | $f_{SA}$ | 10 kHz |

FIG. 21

CIRCUIT CONSTANTS USED FOR SIMULATION

| RATED POWER | $P_{dc1}$, $P_{dc2}$ | 400 kW |
|---|---|---|
| FIRST DC VOLTAGE | $v_{dc1}$ | 1.5 kV |
| SECOND DC VOLTAGE | $v_{dc2}$ | 0.6 kV |
| INDUCTANCE | L | 0.3 mH |
| ELECTROSTATIC CAPACITANCE | C | 2.0 mF |
| DC CAPACITOR VOLTAGE | $v_C$ | 450 V |
| NUMBER OF UNITS | M | 3 |
| NUMBER OF CHOPPER CELLS FOR EACH UNIT | N | 3 |
| CARRIER FREQUENCY OF MAIN POWER CONVERTER | $f_{SM}$ | 450 Hz |
| CARRIER FREQUENCY OF AUXILIARY POWER CONVERTER | $f_{SA}$ | 10 kHz |

FIG. 26

CIRCUIT CONSTANTS USED FOR SIMULATION

| RATED POWER | $P_{dc1}, P_{dc2}$ | 400 kW |
|---|---|---|
| FIRST DC VOLTAGE | $v_{dc1}$ | 1.5 kV |
| SECOND DC VOLTAGE | $v_{dc2}$ | 0.75 kV |
| INDUCTANCE | L | 0.3 mH |
| ELECTROSTATIC CAPACITANCE | C | 3.3 mF |
| DC CAPACITOR VOLTAGE | $v_C$ | 600 V |
| NUMBER OF UNITS | M | 3 |
| NUMBER OF CHOPPER CELLS FOR EACH UNIT | N | 3 |
| CARRIER FREQUENCY OF MAIN POWER CONVERTER | $f_{SM}$ | 450 Hz |
| CARRIER FREQUENCY OF AUXILIARY POWER CONVERTER | $f_{SA}$ | 10 kHz |

CHOPPER CIRCUIT

CROSS-REFERENCE TO RELATED APPLICATIONS

This application is a 371 National Phase application of PCT/JP2019/040752, filed Oct. 16, 2019, which application claims priority to JP 2018-199400, filed Oct. 23, 2018, the contents of which are incorporated by reference.

TECHNICAL FIELD

The present disclosure relates to a chopper circuit which converts a voltage between a first DC voltage across first external connection terminals and a second DC voltage across second external connection terminals.

BACKGROUND ART

In recent years, the application of a battery power storage system to a DC electric railway is in progress. For example, the use of a high-capacity lithium-ion battery mounted on a railway vehicle achieves a travel distance of 25 [km] or more on a single charge even when zero power is supplied from an overhead line.

Since the overhead line voltage of a DC electric railway is generally different from the operating voltage of an energy storage element, voltage conversion (power conversion) may be preferably performed using a bidirectional chopper circuit. FIG. 28 is a circuit diagram illustrating a general bidirectional chopper circuit. A bidirectional chopper circuit 101 includes a first switch unit (positive valve device) 121-1 and a second switch unit (negative valve device) 121-2 which are connected in series with each other to conduct electricity in the same direction in the ON state, and one of which is turned on when the other switch unit is turned off, and an inductor 113 connected to the connection point between the first switch unit 121-1 and the second switch unit 121-2. Each of the first switch unit 121-1 and the second switch unit 121-2 is formed by a semiconductor switching element which conducts electricity in one direction in the ON state, and a feedback diode connected in antiparallel with the semiconductor switching element. In a DC electric railway including a battery power storage system, a high-voltage side DC voltage $V_{dc1}$ corresponds to the overhead line voltage, and a low-voltage side DC voltage $V_{dc2}$ corresponds to the operating voltage of an energy storage element. When, for example, the standard voltage of the overhead line is $V_{dc1}=1,500$ [V], $V_{dc2}$ is set to about 600 [V] to 700 [V]. In recent years, a high-capacity bidirectional chopper having a converter capacity of 500 [kW] when used alone has been developed. In this case, a DC component of an inductor current $i_L$ has a current of 500 [A] or more.

In recent years, furthermore, a bidirectional chopper circuit using an auxiliary converter has been proposed.

For example, a bidirectional chopper circuit which bidirectionally converts a voltage between a first DC voltage across a pair of first external connection terminals and a second DC voltage across a pair of second external connection terminals is known to include a main power converter including first and second switch units which are connected in series with each other to conduct electricity in the same direction in an ON state, and one of which is turned on when the other switch unit is turned off, the main power converter having, as the pair of first external connection terminals, two side terminals on a side opposite to a side on which the first switch unit is connected to the second switch unit, one single-phase full-bridge power converter or a plurality of single-phase full-bridge power converters cascaded to each other, provided on wiring branching from wiring connecting the first switch unit to the second switch unit, and an inductor connected in series with the single-phase full-bridge power converter on the wiring branching from the wiring connecting the first switch unit to the second switch unit, wherein the pair of second external connection terminals are provided at any position on the wiring that branches from the wiring connecting the first switch unit to the second switch unit, and is provided with the inductor and the single-phase full-bridge power converter (see, e.g., PTL 1).

CITATIONS LIST

Patent Literature

[PATENT LITERATURE 1] International Publication No. WO 2017/038122

SUMMARY OF INVENTION

Technical Problem

In the chopper circuit, miniaturization and lightweight design of the inductor are posed as significant challenges, and are especially important when the inductor is mounted on a movable body such as a DC electric railway. Since the weight and the volume of the inductor are proportional to the stored energy of the inductor, the miniaturization and lightweight design of the inductor can be achieved by reducing the inductance of the inductor. The reduction in inductance, however, increases ripple currents contained in a current flowing through the inductor, and may therefore result in degradation in power quality or an unstable operation of the converter.

In, e.g., the bidirectional chopper circuit illustrated in FIG. 28, the inductor 113 acts as a main factor making the system heavier in weight and larger in volume. DC circuit breakers 114 and 115 may be preferably placed on the high- and low-voltage sides, respectively, resulting in a higher cost and a lower reliability. When the inductor current $i_L$ is implemented as a direct current, a square wave current which changes stepwise flows as a high-voltage side current $i_{dc1}$. When the square wave current flows, overvoltages may occur due to the influence of a wiring inductance on the high-voltage side. In the first switch unit 121-1 and the second switch unit 121-2, so-called "hard switching" is performed in which the current is cut off during device energization. As a result, switching losses occur in the first switch unit 121-1 and the second switch unit 121-2, resulting in a lower converter efficiency.

It is, therefore, desired to achieve a compact, lightweight, highly reliable, low-loss chopper circuit which causes no overvoltages.

Solution to Problem

According to a first aspect of the present disclosure, a chopper circuit which converts a voltage between a first direct-current voltage on a first external connection terminal and a second direct-current voltage on a second external connection terminal includes a first switch unit including a first external connection terminal, a second switch unit connected in series with the first switch unit to conduct electricity in a direction identical to a direction in which the first switch unit conducts electricity in an ON state, and including a second external connection terminal on a side opposite to a side on which the first switch unit is connected to the second switch unit, at least one semiconductor power converter including one of a single semiconductor power converter and a plurality of semiconductor power converters cascaded to each other, provided on wiring branching from wiring connecting the first switch unit to the second switch unit, an inductor connected in series with the at least one semiconductor power converter, on wiring branching from wiring connecting the first switch unit to the second switch unit, a semiconductor power converter control unit configured to control a power conversion operation of the at least one semiconductor power converter to output a current containing a direct-current component and an alternating-current component having a predetermined period, and a switch control unit configured to control one of the first switch unit and the second switch unit to be ON and control the other switch unit to be OFF, the switch control unit being configured to perform switching from ON to OFF and switching from OFF to ON for the first switch unit and the second switch unit when a value of a current output from the at least one semiconductor power converter is controlled to be not more than a predetermined value by the semiconductor power converter control unit.

As a chopper circuit according to a modification to the first aspect, a chopper circuit which converts a voltage between a first direct-current voltage on a first external connection terminal and a second direct-current voltage on a second external connection terminal may include a first switch unit including a first external connection terminal, a second switch unit connected in series with the first switch unit to conduct electricity in a direction identical to a direction in which the first switch unit conducts electricity in an ON state, and including a second external connection terminal on a side opposite to a side on which the first switch unit is connected to the second switch unit, at least one semiconductor power converter including one of a single semiconductor power converter and a plurality of semiconductor power converters cascaded to each other, provided on wiring branching from wiring connecting the first switch unit to the second switch unit, and an inductor connected in series with the at least one semiconductor power converter, on wiring branching from wiring connecting the first switch unit to the second switch unit, wherein the first switch unit may include two first switch units, and the second switch unit may include two second switch units.

The chopper circuit according to the modification to the first aspect may further include a semiconductor power converter control unit configured to control a power conversion operation of the at least one semiconductor power converter to output a current containing a direct-current component and an alternating-current component having a predetermined period, and a switch control unit configured to control one of the first switch unit and the second switch unit to be ON and control the other switch unit to be OFF, the switch control unit being configured to perform switching from ON to OFF and switching from OFF to ON for the first switch unit and the second switch unit when a value of a current output from the at least one semiconductor power converter is controlled to be not more than a predetermined value by the semiconductor power converter control unit.

According to a second aspect of the present disclosure, a chopper circuit which converts a voltage between a first direct-current voltage across a pair of first external connection terminals and a second direct-current voltage across a pair of second external connection terminals includes a first switch unit, a second switch unit, a third switch unit, and a fourth switch unit connected in series with each other to conduct electricity in an identical direction in an ON state, at least one semiconductor power converter including one of a single semiconductor power converter and a plurality of semiconductor power converters cascaded to each other, provided on wiring connecting a connection point between the first switch unit and the second switch unit to a connection point between the third switch unit and the fourth switch unit, an inductor connected in series with the at least one semiconductor power converter, on wiring connecting a connection point between the first switch unit and the second switch unit to a connection point between the third switch unit and the fourth switch unit, a semiconductor power converter control unit configured to control a power conversion operation of the at least one semiconductor power converter to output a current containing a direct-current component and an alternating-current component having a predetermined period, and a switch control unit configured to control one of a set of the first switch unit and the third switch unit and a set of the second switch unit and the fourth switch unit to be ON and control the other set of switch units to be OFF, the switch control unit being configured to perform switching from ON to OFF and switching from OFF to ON for each of a set of the first switch unit and the third switch unit and a set of the second switch unit and the fourth switch unit when a value of a current output from the at least one semiconductor power converter is controlled to be not more than a predetermined value by the semiconductor power converter control unit, wherein a terminal on a side opposite to a side on which the first switch unit is connected to the second switch unit, and a terminal on a side opposite to a side on which the third switch unit is connected to the fourth switch unit are provided as the pair of first external connection terminals, and a terminal on a side on which the second switch unit is connected to the third switch unit, and a terminal on a side of the fourth switch unit opposite to a side of the fourth switch unit on which the third switch unit is connected to the fourth switch unit are provided as the pair of second external connection terminals.

According to a third aspect of the present disclosure, a chopper circuit which converts a voltage between a first direct-current voltage across a pair of first external connection terminals and a second direct-current voltage across a pair of second external connection terminals includes a first main power converter including a first switch unit and a second switch unit which are connected in series with each other to conduct electricity in an identical direction in an ON state, and one of which is turned on when the other switch unit is turned off, the first main power converter having, as the pair of first external connection terminals, two side terminals on a side opposite to a side on which the first switch unit is connected to the second switch unit, at least one semiconductor power converter including one of a single semiconductor power converter and a plurality of semiconductor power converters cascaded to each other, provided on wiring branching from wiring connecting the first switch unit to the second switch unit, an inductor connected in series with the at least one semiconductor power converter, on wiring branching from wiring connecting the first switch unit to the second switch unit, and a second main power converter including a third switch unit and a fourth switch unit which are connected in series with each other to conduct electricity in an identical direction in an ON state, and one of which is turned on when the other switch unit is turned off, the second main power converter having, as the pair of second external connection terminals, two side terminals on a side opposite to a side on which the third switch unit is connected to the fourth switch unit, wherein wiring that branches from wiring connecting the first switch unit to the second switch unit, and is provided with the at least one semiconductor power converter and the inductor is connected to a connection point between the third switch unit and the fourth switch unit.

The chopper circuit according to the third aspect may further include a semiconductor power converter control unit configured to control a power conversion operation of the at least one semiconductor power converter to output a current containing a direct-current component and an alternating-current component having a predetermined period, and a switch control unit configured to control one of a set of the first switch unit and the third switch unit and a set of the second switch unit and the fourth switch unit to be ON and control the other set of switch units to be OFF, the switch control unit being configured to perform switching from ON to OFF and switching from OFF to ON for each of a set of the first switch unit and the third switch unit and a set of the second switch unit and the fourth switch unit when a value of a current output from the at least one semiconductor power converter is controlled to be not more than a predetermined value by the semiconductor power converter control unit.

In the chopper circuit according to each of the first aspect, the modification to the first aspect, the second aspect, and the third aspect, the above-mentioned predetermined value may be set to zero.

In the chopper circuit according to each of the first aspect, the modification to the first aspect, the second aspect, and the third aspect, the at least one semiconductor power converter circuit may be implemented as a chopper cell formed by two series-connected semiconductor switches and a direct-current capacitor connected in parallel with the two semiconductor switches, and having, as an output terminal, each terminal of one semiconductor switch of the two semiconductor switches.

In the chopper circuit according to each of the first aspect, the modification to the first aspect, the second aspect, and the third aspect, each of the semiconductor switches may include a semiconductor switching element configured to conduct a current in one direction in an ON state, and a feedback diode connected in antiparallel with the semiconductor switching element.

Advantageous Effects of Invention

According to each of the first aspect, the modification to the first aspect, the second aspect, and the third aspect of the present disclosure, a compact, lightweight, highly reliable, low-loss chopper circuit which causes no overvoltages can be achieved.

BRIEF DESCRIPTION OF DRAWINGS

FIG. 14 is a table illustrating circuit constants used for simulation of the chopper circuit system formed by the three parallel-connected chopper circuits according to the first embodiment of the present disclosure, in which the simulation used "PSCAD/EMTDC."

FIG. 21 is a table illustrating circuit constants used for simulation of a chopper circuit system formed by three parallel-connected chopper circuits according to the second embodiment of the present disclosure.

FIG. 26 is a table illustrating circuit constants used for simulation of a chopper circuit system formed by three parallel-connected chopper circuits according to the third embodiment of the present disclosure.

DESCRIPTION OF EMBODIMENTS

A chopper circuit will be described below with reference to the drawings. These drawings use different scales as appropriate to facilitate an understanding. The mode illustrated in each drawing is one example for carrying out the present disclosure, and the present disclosure is not limited to the embodiments illustrated in these drawings.

Figure 1:
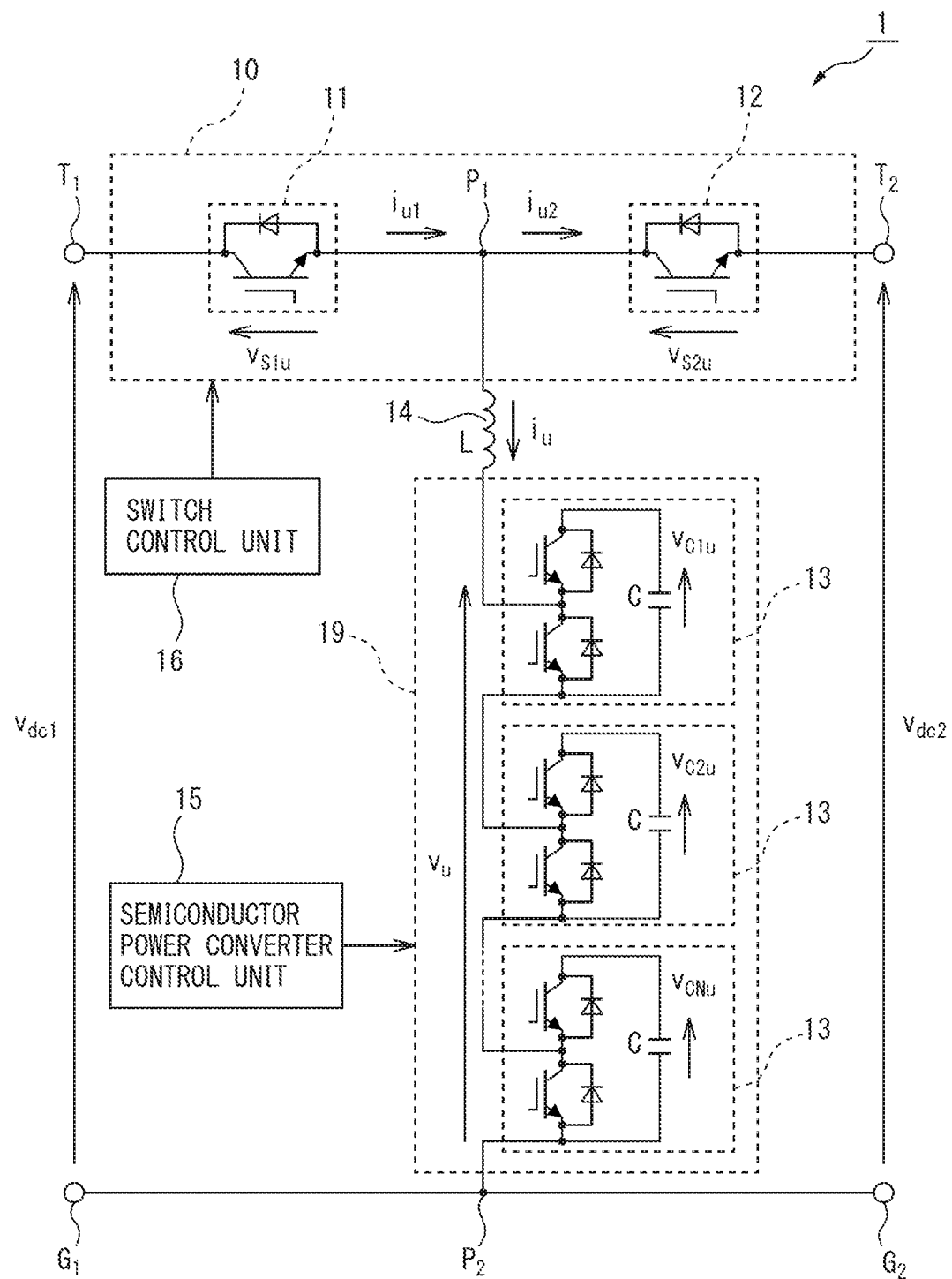
FIG. 1 is a circuit diagram illustrating a chopper circuit according to a first embodiment of the present disclosure.
Figure 2:
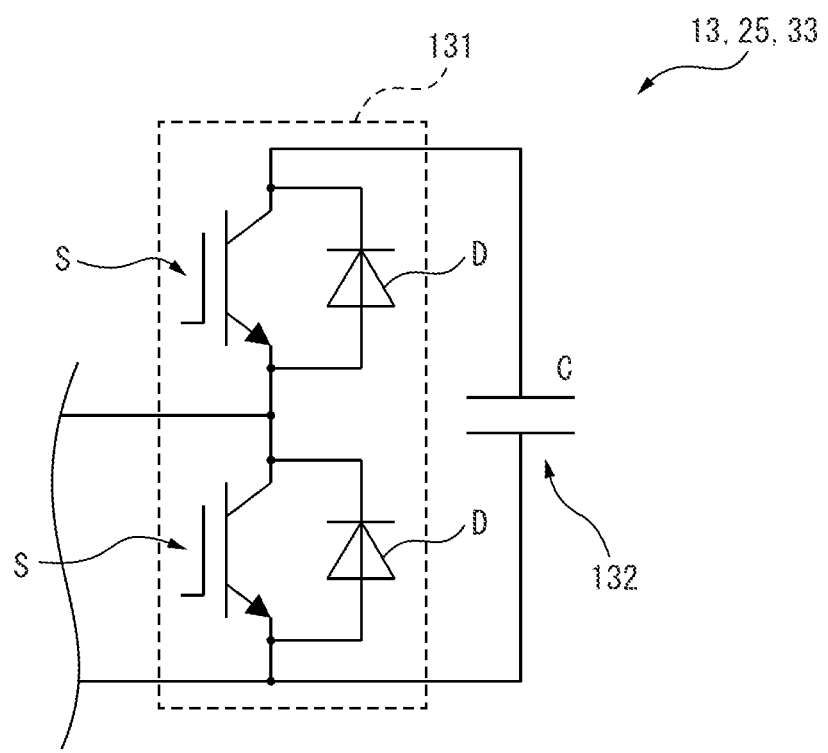
FIG. 2 is a circuit diagram for explaining a semiconductor power converter in the chopper circuit or a chopper circuit according to each of the first embodiment to a third embodiment of the present disclosure.

FIG. 1 is a circuit diagram illustrating a chopper circuit according to a first embodiment of the present disclosure. FIG. 2 is a circuit diagram for explaining a semiconductor power converter in the chopper circuit or a chopper circuit according to each of the first embodiment to a third embodiment of the present disclosure.

A chopper circuit 1 according to the first embodiment of the present disclosure bidirectionally converts a voltage between a first DC voltage $v_{dc1}$ across a pair of first external connection terminals $T_1$ and $G_1$ and a second DC voltage $v_{dc2}$ across a pair of second external connection terminals $T_2$ and $G_2$. A DC power supply is connected to one of a set of the first external connection terminals $T_1$ and $G_1$ and a set of the second external connection terminals $T_2$ and $G_2$, and a load or another DC power supply is connected to the other set of external connection terminals.

When, for example, a DC power supply is connected to the first external connection terminals $T_1$ and $G_1$, and a load is connected to the second external connection terminals $T_2$ and $G_2$, the chopper circuit 1 operates as a step-down chopper. In this case, a voltage output from the DC power supply is used as the first DC voltage $v_{dc1}$, and a voltage applied to the load is used as the second DC voltage $v_{dc2}$.

When, as another example, a load is connected to the first external connection terminals $T_1$ and $G_1$, and a DC power supply is connected to the second external connection terminals $T_2$ and $G_2$, the chopper circuit 1 operates as a step-up chopper. In this case, a voltage applied to the load is used as the first DC voltage $v_{dc1}$, and a voltage output from the DC power supply is used as the second DC voltage $v_{dc2}$.

As still another example, a DC power supply may be connected to the first external connection terminals $T_1$ and $G_1$, and another DC power supply may be connected to the second external connection terminals $T_2$ and $G_2$.

The chopper circuit 1 includes a first switch unit 11, a second switch unit 12, a semiconductor power converter 13, and an inductor 14. The chopper circuit 1 further includes a semiconductor power converter control unit 15 and a switch control unit 16 as its control system.

The first switch unit 11 is implemented as a semiconductor valve device capable of unidirectional current cutoff. The first switch unit 11 is formed by a semiconductor switching element which conducts electricity in one direction in the ON state, and a feedback diode connected in antiparallel with the semiconductor switching element. Examples of the semiconductor switching element may include an IGBT, an SiC (Silicon Carbide)-MOSFET (Metal-Oxide-Semiconductor Field-Effect Transistor), a thyristor, a GTO (Gate Turn-OFF Thyristor), and a transistor, but the type of semiconductor switching element itself does not limit the present invention, and other types of semiconductor elements may also be used.

The first switch unit 11 includes the first external connection terminal $T_1$. The connection point between the first switch unit 11 and the second switch unit 12 is represented by $P_1$. In other words, the connection point $P_1$ is located on the side of the first switch unit 11 opposite to that of the first switch unit 11 on which the first external connection terminal $T_1$ is provided. The forward voltage (i.e., the potential difference between the first external connection terminal $T_1$ and the connection point $P_1$) of the first switch unit 11 is represented by $v_{S1u}$.

The second switch unit 12 is implemented as a semiconductor valve device capable of unidirectional current cutoff. The first switch unit 11 is formed by a semiconductor switching element which conducts electricity in one direction in the ON state, and a feedback diode connected in antiparallel with the semiconductor switching element. Examples of the semiconductor switching element may include an IGBT, an SiC (Silicon Carbide)-MOSFET (Metal-Oxide-Semiconductor Field-Effect Transistor), a thyristor, a GTO (Gate Turn-OFF Thyristor), and a transistor, but the type of semiconductor switching element itself does not limit the present invention, and other types of semiconductor elements may also be used.

The second switch unit 12 is connected in series with the first switch unit 11 at the connection point $P_1$ to conduct electricity in the same direction as that in which the first switch unit 11 conducts electricity in the ON state. The second switch unit 12 includes the second external connection terminal $T_2$ on the side opposite to the side (connection point $P_1$) on which the first switch unit 11 is connected to the second switch unit 12. The forward voltage (i.e., the potential difference between the connection point $P_1$ and the second external connection terminal $T_2$) of the second switch unit 12 is represented by $v_{S2u}$.

In this specification, a set of power converters formed by the first switch unit 11 and the second switch unit 12 will be referred to as a main power converter 10 hereinafter. While one of the first switch unit 11 and the second switch unit 12 is controlled to be ON, the other switch unit is controlled to be OFF, as will be described later.

The inductor 14 and a variable controlled voltage source which uses the semiconductor power converter 13 are provided on wiring branching from the connection point $P_1$ between the first switch unit 11 and the second switch unit 12.

The semiconductor power converter 13 is provided as one semiconductor power converter 13 alone or a plurality of semiconductor power converters 13 cascaded to each other, on the wiring branching from the connection point $P_1$ between the first switch unit 11 and the second switch unit 12. In this specification, one or more semiconductor power converters 13 will be referred to as an auxiliary power converter 19 hereinafter. In this specification, furthermore, when only one semiconductor power converter 13 is provided, the side on which the inductor 14 (to be described later) is connected to it will be referred to as a "first DC side" hereinafter, and when a plurality of semiconductor power converters 13 are cascaded to each other, the side on which another semiconductor power converter 13 different from the semiconductor power converter 13 connected to the inductor 14 is connected to the latter semiconductor power converter 13 will also be referred to as a "first DC side" hereinafter. The DC side opposite to the "first DC side" will be referred to as a "second DC side" hereinafter. As one example, FIG. 1 exemplifies the case where a plurality of (N: an integer of 2 or more) semiconductor power converters 13 are cascaded to each other on the first DC side. The number of cascades of the semiconductor power converters 13 is represented by j (where j is a natural number of 1 to N) hereinafter. High voltage resistance design of the chopper circuit 1 can easily be achieved simply by adjusting, as appropriate, the number of semiconductor power converters 13 to be cascaded to each other.

The semiconductor power converter 13 is implemented as a bidirectional chopper cell including a DC/DC convener 131 and a capacitor 132. In other words, the semiconductor power converter 13 is implemented as a chopper cell formed by two series-connected semiconductor switches and a DC capacitor connected in parallel with the two semiconductor switches, and having, as an output terminal, each terminal of one semiconductor switch of the two semiconductor switches. More specifically, the DC/DC converter 131 is formed by two semiconductor switching elements S connected in series with each other, and a feedback diode D connected in antiparallel with each of the semiconductor switching elements S. Examples of each semiconductor switching element S may include an IGBT, an SiC (Silicon Carbide)-MOSFET (Metal-Oxide-Semiconductor Field-Effect Transistor), a thyristor, a GTO (Gate Turn-OFF Thyristor), and a transistor, but the type of semiconductor switching element itself does not limit the present invention, and other types of semiconductor elements may also be used. The capacitor 132 is provided on the second DC side of the semiconductor power converter 13. In operating the chopper circuit 1, the DC/DC converter 131 is operated to initially charge the capacitor 132. The voltage of the DC capacitor of each semiconductor power converter 13 is defined as $v_{Cju}$, and the voltage on the first DC side of the auxiliary power converter 19 is defined as $v_u$. Although details will be described later, the inductor 14 and the auxiliary power converter 19 operate as a controlled current source by controlling an inductor current $i_u$ using the auxiliary power converter 19. Referring to FIG. 1, an auxiliary power converter is implemented by cascading the semiconductor power converters 13 (chopper cells) to each other, but any arbitrary semiconductor power converter having the same functions can also be substituted for the auxiliary power converter.

The inductor 14 is connected in series with the semiconductor power converter 13 on the wiring branching from the connection point $P_1$ located on wiring connecting the first switch unit 11 to the second switch unit 12. An inductor current flowing through the inductor 14 interposed between the connection point $P_1$ and a connection point $P_2$ is defined as $i_u$.

Figure 3:
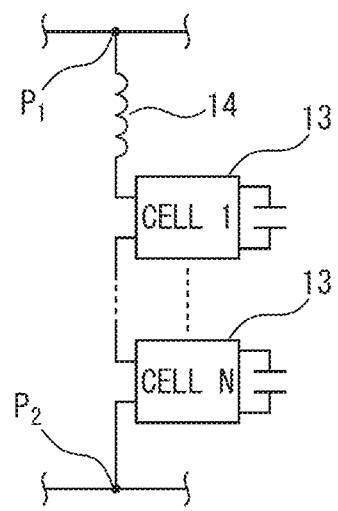
FIG. 3 illustrates circuit diagrams each depicting an exemplary arrangement of semiconductor power converters and an inductor in the chopper circuit according to each of the first to third embodiments of the present disclosure.
Figure 3:
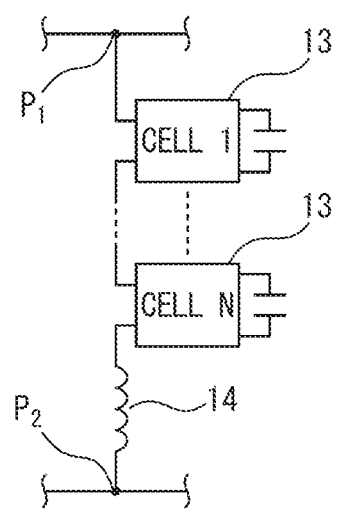
Figure 3:
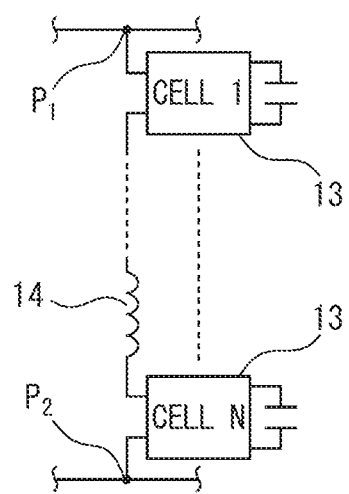

The semiconductor power converter 13 and the inductor 14 are, therefore, provided on the same wiring branching from the connection point $P_1$ located on the wiring connecting the first switch unit 11 to the second switch unit 12 in the main power converter 10. In the example illustrated in FIG. 1, the inductor 14 is interposed between the connection point $P_1$ and the semiconductor power converter 13, and the second external connection terminals $T_2$ and $G_2$ are placed at the connection point $P_2$ (i.e., on the side of the set of the semiconductor power converters 13 opposite to that of the set of the semiconductor power converters 13 on which the inductor 14 is connected to the semiconductor power converter 13) on the side of the auxiliary power converter 19 opposite to that of the auxiliary power converter 19 on which the inductor 14 is connected to the auxiliary power converter 19, but the order of placement of the semiconductor power converter 13 and the inductor 14 can be freely designed on the wiring between the connection points $P_1$ and $P_2$. FIG. 3 illustrates circuit diagrams each depicting an exemplary arrangement of semiconductor power converters and an inductor in the chopper circuit according to each of the first to third embodiments of the present disclosure. As for the semiconductor power converters 13 illustrated in FIG. 3, to facilitate an understanding, capacitors C (capacitors 132) in the semiconductor power converters 13 illustrated in FIGS. 1 and 2 are illustrated as located outside the semiconductor power converters 13. N (where N is a natural number) semiconductor power converters 13 are respectively represented as cell 1, . . . , cell j, . . . , cell N. In the example illustrated in FIG. 3(A), the inductor 14 is interposed between the connection point $P_1$ and cell 1 of the semiconductor power converter 13. In the example illustrated in FIG. 3(B), the inductor 14 is interposed between cell N of the semiconductor power converter 13 and the connection point $P_2$. In the example illustrated in FIG. 3(C), the inductor 14 is placed on the opposite side of cell N of the semiconductor power converter 13 with respect to the connection point $P_2$.

The semiconductor power converter control unit 15 controls the power conversion operation of the semiconductor power converter 13 to output a current containing a DC component and an AC component having a predetermined period.

The switch control unit 16 controls one of the first switch unit 11 and the second switch unit 12 to be ON and controls the other switch unit to be OFF. The switch control unit 16 performs switching from ON to OFF and switching from OFF to ON for the first switch unit 11 and the second switch unit 12 when the value of the current output from the semiconductor power converter 13 is controlled to be equal to or smaller than a predetermined value by the semiconductor power converter control unit 15. The predetermined value means herein a value sufficiently smaller than the rated current of the semiconductor power converter 13. As one example, the predetermined value is set to a value of, e.g., about 0% to 10% of the rated current of the semiconductor power converter 13, but it may be set to a value larger than 10% of the rated current of the semiconductor power converter 13, depending on the environment under which the chopper circuit 1 is applied.

The semiconductor power converter control unit 15 and the switch control unit 16 may be constructed in, e.g., software program form, or may be constructed as a combination of various electronic circuits and a software program. When, for example, these units are constructed in software program form, the function of each of the above-mentioned units can be implemented by causing an arithmetic processing unit to operate in accordance with the software program. Alternatively, the semiconductor power converter control unit 15 and the switch control unit 16 may be implemented as a semiconductor integrated circuit in which a software program for implementing the function of each of these units is written. The operations of the semiconductor power converter control unit 15 and the switch control unit 16 will be described in detail later.

The chopper circuit 1 according to the first embodiment can bidirectionally convert a voltage between the first DC voltage $v_{dc1}$ across the pair of first external connection terminals $T_1$ and $G_1$ and the second DC voltage $v_{dc2}$ across the pair of second external connection terminals $T_2$ and $G_2$. However, the chopper circuit 1 including two semiconductor valve devices, i.e., the first switch unit 11 and the second switch unit 12 as the main power converter 10, as illustrated in FIG. 1, may preferably have a relationship "$v_{dc1} > v_{dc2}$" in which the first DC voltage $v_{dc1}$ is higher than the second DC voltage $v_{dc2}$. While one of the first switch unit 11 and the second switch unit 12 is controlled to be ON, the other switch unit is controlled to be OFF.

To bidirectionally convert a voltage between the first DC voltage $v_{dc1}$ and the second DC voltage $v_{dc2}$ regardless of the relationship in value between the first DC voltage $v_{dc1}$ and the second DC voltage $v_{dc2}$, four semiconductor valve devices capable of unidirectional current cutoff, or two semiconductor valve devices capable of bidirectional current cutoff may be preferably provided as a main power converter.

Figure 4:
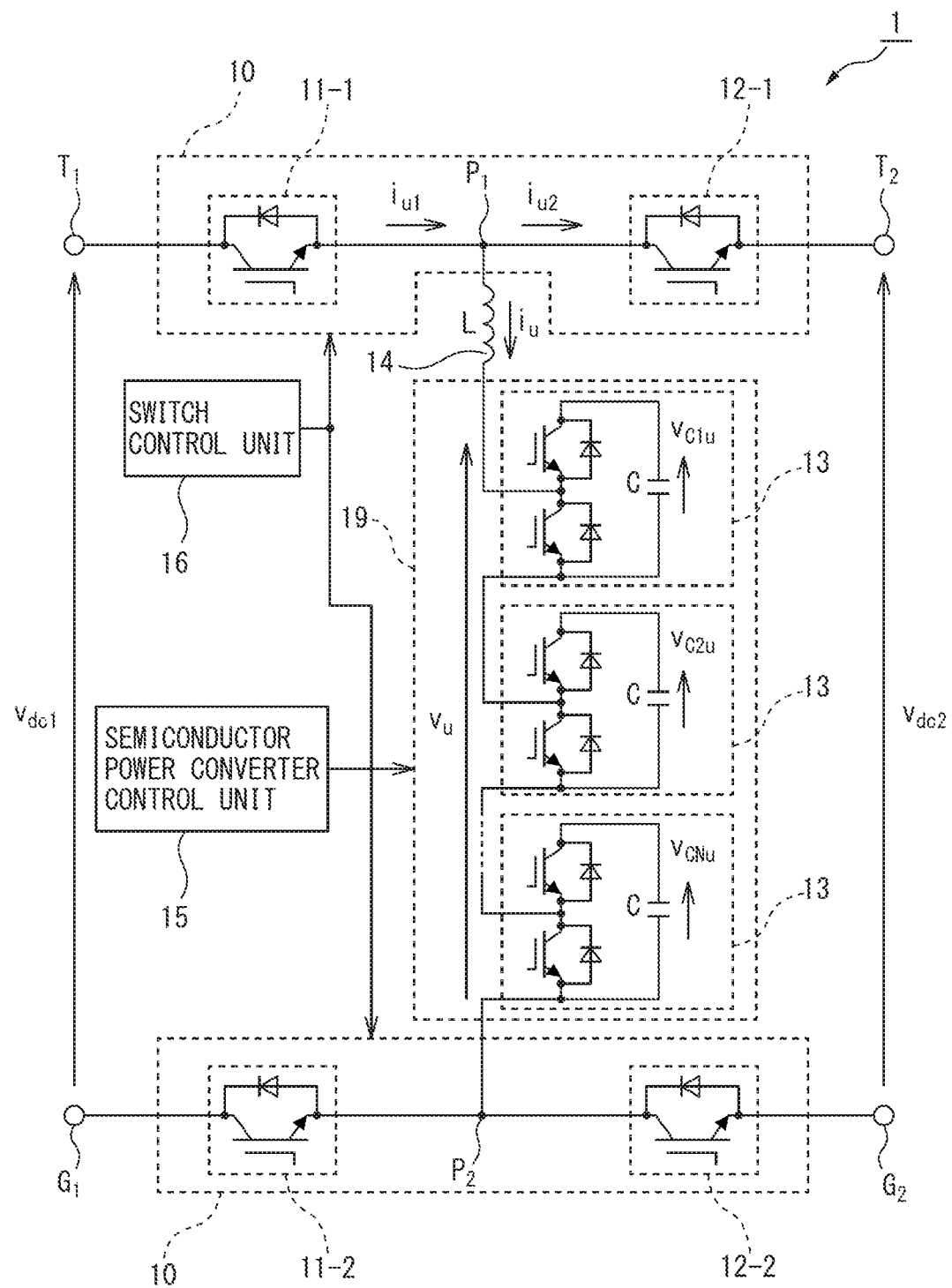
FIG. 4 is a circuit diagram illustrating a first modification of the chopper circuit according to the first embodiment of the present disclosure.

FIG. 4 is a circuit diagram illustrating a first modification of the chopper circuit according to the first embodiment of the present disclosure. In the first modification of the chopper circuit according to the first embodiment, four semiconductor valve devices, i.e., first switch units 11-1 and 11-2 and second switch units 12-1 and 12-2 are provided as a main power converter 10. Each of the first switch units 11-1 and 11-2 and the second switch units 12-1 and 12-2 is implemented as a semiconductor valve device capable of unidirectional current cutoff, and is formed by a semiconductor switching element which conducts electricity in one direction in the ON state, and a feedback diode connected in antiparallel with the semiconductor switching element. The first switch unit 11-1 is interposed between a first external connection terminal $T_1$ and a connection point $P_1$. The first switch unit 11-2 is interposed between a ground terminal $G_1$ in a first external connection terminal and a connection point $P_2$. The second switch unit 12-1 is interposed between the connection point $P_1$ and a second external connection terminal $T_2$. The second switch unit 12-2 is interposed between the connection point $P_2$ and a ground terminal $G_2$ in a second external connection terminal. The second switch unit 12-1 is connected in series with the first switch unit 11-1 at the connection point $P_1$ to conduct electricity in the same direction as that in which the first switch unit 11-1 conducts electricity in the ON state. The second switch unit 12-2 is connected in series with the first switch unit 11-2 at the connection point $P_2$ to conduct electricity in the same direction as that in which the first switch unit 11-2 conducts electricity in the ON state. To bidirectionally convert a voltage between a first DC voltage $v_{dc1}$ and a second DC voltage $v_{dc2}$ in a relationship "$v_{dc1}>v_{dc2}$" in which the first DC voltage $v_{dc1}$ is higher than the second DC voltage $v_{dc2}$, the first switch unit 11-2 and the second switch unit 12-2 are always set ON, and while one of the first switch unit 11-1 and the second switch unit 12-1 is controlled to be ON, the other switch unit is controlled to be OFF. In this case, the chopper circuit 1 illustrated in FIG. 4 is equivalent to the chopper circuit illustrated in FIG. 1. To bidirectionally convert a voltage between the first DC voltage $v_{dc1}$ and the second DC voltage $v_{dc2}$ in a relationship "$v_{dc1}<v_{dc2}$" in which the first DC voltage $v_{dc1}$ is lower than the second DC voltage $v_{dc2}$, the first switch unit 11-1 and the second switch unit 12-1 are always set ON, and while one of the first switch unit 11-2 and the second switch unit 12-2 is controlled to be ON, the other switch unit is controlled to be OFF.

Figure 5:
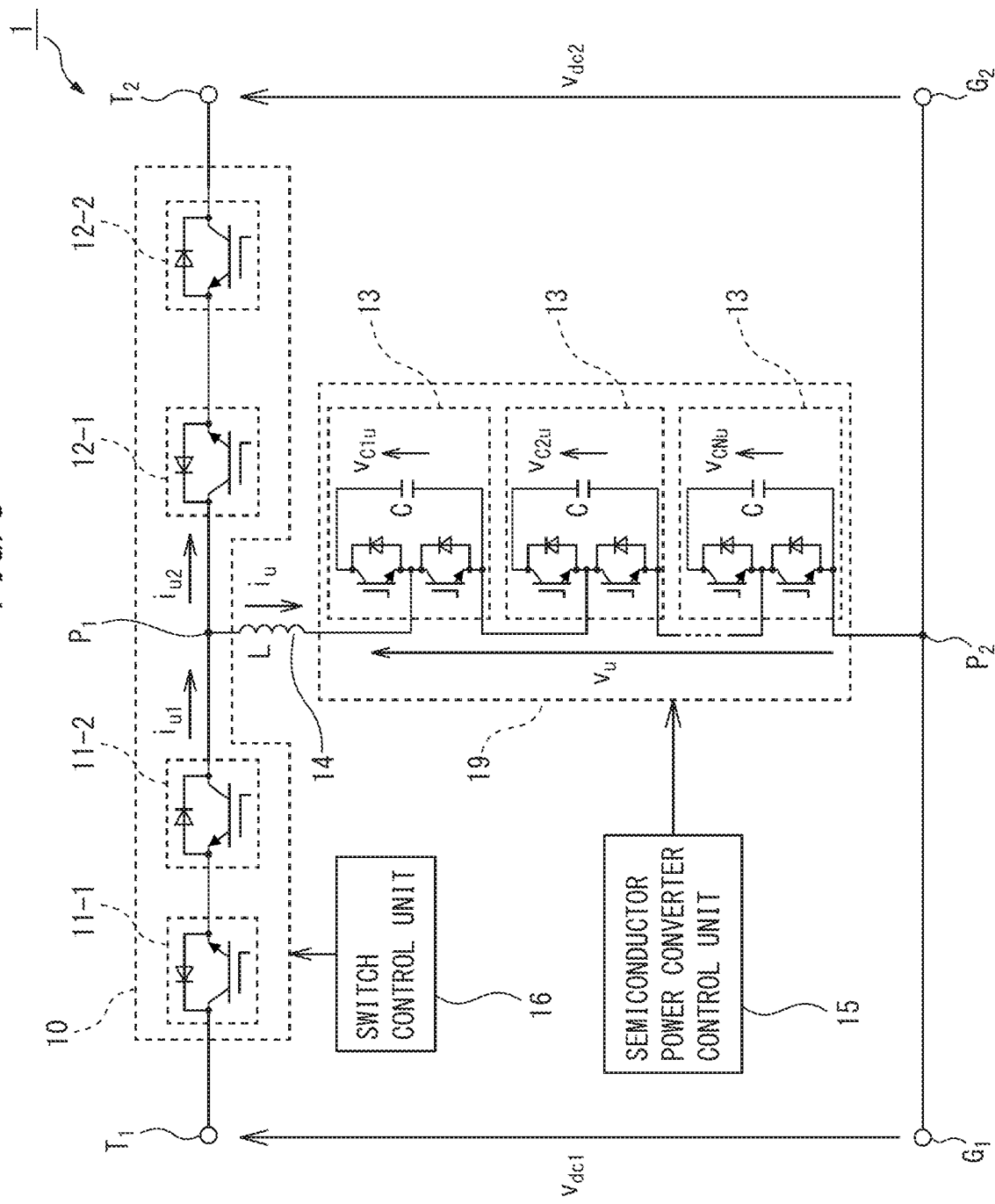
FIG. 5 is a circuit diagram illustrating a second modification of the chopper circuit according to the first embodiment of the present disclosure.

FIG. 5 is a circuit diagram illustrating a second modification of the chopper circuit according to the first embodiment of the present disclosure. In the second modification of the chopper circuit according to the first embodiment, four semiconductor valve devices, i.e., first switch units 11-1 and 11-2 and second switch units 12-1 and 12-2 are provided as a main power converter 10. Each of the first switch units 11-1 and 11-2 and the second switch units 12-1 and 12-2 is implemented as a semiconductor valve device capable of unidirectional current cutoff, and is formed by a semiconductor switching element which conducts electricity in one direction in the ON state, and a feedback diode connected in antiparallel with the semiconductor switching element. The first switch units 11-1 and 11-2 are interposed between a first external connection terminal $T_1$ and a connection point $P_1$. The first switch unit 11-1 is provided to conduct electricity in the direction opposite to that in which the first switch unit 11-2 conducts electricity in the ON state. The first switch units 11-1 and 11-2 may be interchanged with each other. The second switch units 12-1 and 12-2 are interposed between the connection point $P_1$ and a second external connection terminal $T_2$. The second switch unit 12-1 is provided to conduct electricity in the direction opposite to that in which the second switch unit 12-2 conducts electricity in the ON state. The second switch units 12-1 and 12-2 may be interchanged with each other. The second switch unit 12-1 is provided to conduct electricity in the same direction as that in which the first switch unit 11-1 conducts electricity in the ON state. The second switch unit 12-2 is provided to conduct electricity in the same direction as that in which the first switch unit 11-2 conducts electricity in the ON state. To bidirectionally convert a voltage between a first DC voltage $v_{dc1}$ and a second DC voltage $v_{dc2}$ in a relationship "$v_{dc1}>v_{dc2}$" in which the first DC voltage $v_{dc1}$ is higher than the second DC voltage $v_{dc2}$, the first switch unit 11-2 and the second switch unit 12-2 are always set ON, and while one of the first switch unit 11-1 and the second switch unit 12-1 is controlled to be ON, the other switch unit is controlled to be OFF. To bidirectionally convert a voltage between the first DC voltage $v_{dc1}$ and the second DC voltage $v_{dc2}$ in a relationship "$v_{dc1}<v_{dc2}$" in which the first DC voltage $v_{dc1}$ is lower than the second DC voltage $v_{dc2}$, the first switch unit 11-1 and the second switch unit 12-1 are always set ON, and while one of the first switch unit 11-2 and the second switch unit 12-2 is controlled to be ON, the other switch unit is controlled to be OFF.

To bidirectionally convert a voltage between the first DC voltage $v_{dc1}$ and the second DC voltage $v_{dc2}$ regardless of the relationship in value between the first DC voltage $v_{dc1}$ and the second DC voltage $v_{dc2}$, when two semiconductor valve devices capable of bidirectional current cutoff are provided as a main power converter, it suffices to implement each of the first switch unit 11 and the second switch unit 12 as a semiconductor valve device capable of bidirectional current cutoff, in the chopper circuit 1 illustrated in FIG. 1.

A snubber circuit for suppressing overvoltages may be connected in parallel with the semiconductor valve device of each of the first switch unit 11 and the second switch unit 12 in the chopper circuit 1 illustrated in FIG. 1, and the semiconductor valve device of each of the first switch units 11-1 and 11-2 and the second switch units 12-1 and 12-2 in the chopper circuits 1 illustrated in FIGS. 4 and 5.

Figure 6:
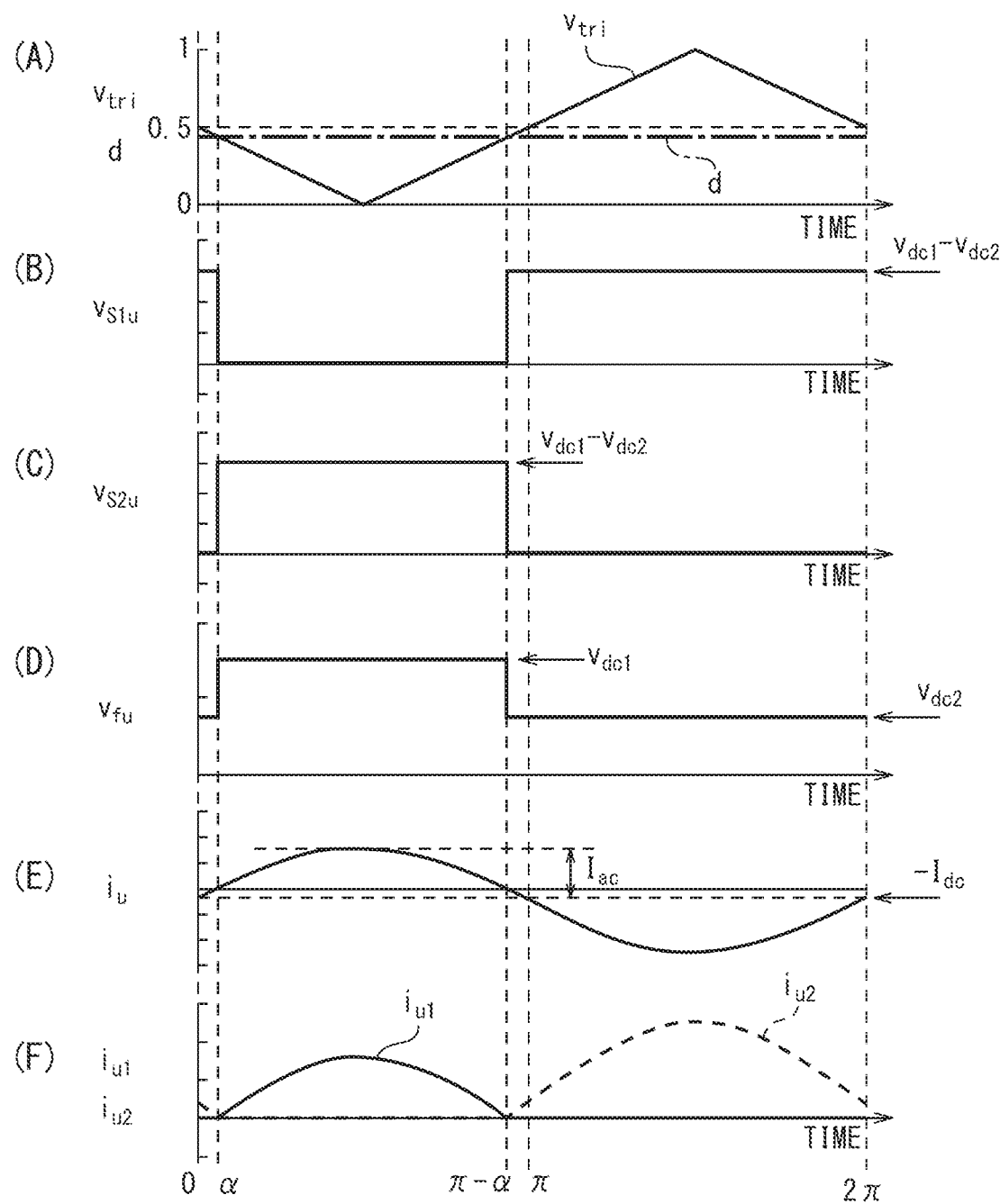
FIG. 6 illustrates graphs of ideal waveforms in respective portions of the chopper circuit according to the first embodiment of the present disclosure, and depicts in (A), the relationship between a triangular wave and a modulation wave used in a switch control unit; in (B), a voltage appearing across the two ends of a first switch unit; in (C), a voltage appearing across the two ends of a second switch unit; in (D), a voltage output from an auxiliary power converter; in (E), an inductor current; and in (F), currents flowing through the first switch unit and the second switch unit.

The operation principle of the chopper circuit 1 according to the first embodiment of the present disclosure will be described subsequently. Since the operation of the chopper circuit 1 according to the first modification to the first embodiment illustrated in FIG. 4 and the operation of the chopper circuit 1 according to the second modification to the first embodiment illustrated in FIG. 5 can be considered to be similar to that of the chopper circuit 1 according to the first embodiment illustrated in FIG. 1, the operation of the chopper circuit 1 according to the first embodiment illustrated in FIG. 1 will be described herein. FIG. 6 illustrates graphs of ideal waveforms in respective portions of the chopper circuit according to the first embodiment of the present disclosure, and depicts in (A), the relationship between a triangular wave and a modulation wave used in a switch control unit; in (B), a voltage appearing across the two ends of a first switch unit; in (C), a voltage appearing across the two ends of a second switch unit; in (D), a voltage output from an auxiliary power converter; in (E), an inductor current; and in (F), currents flowing through the first switch unit and the second switch unit. Referring to FIG. 6(A), a triangular wave $v_{tri}$ is indicated by a solid line, and a modulation wave d is indicated by an alternate long and short dashed line. Referring to FIG. 6(F), a current $i_{u1}$ flowing through the first switch unit is indicated by a solid line, and a current $i_{u2}$ flowing through the second switch unit is indicated by a broken line.

ON and OFF of the first switch unit 11 and the second switch unit 12 are determined by the switch control unit 16, based on the result of comparison between the modulation wave d and the triangular wave $v_{tri}$ that takes a minimum value of 0 and a maximum value of 1. Although the details of a method for determining the modulation wave d will be described later, the modulation wave d is determined by the relationship between the first DC voltage $v_{dc1}$ and the second DC voltage $v_{dc2}$. The switch control unit 16 controls one of the first switch unit 11 and the second switch unit 12 to be ON and controls the other switch unit to be OFF. For example, when, as illustrated in FIG. 6(A), the triangular wave $v_{tri}$ is smaller than the modulation wave d, the switch control unit 16 controls the first switch unit 11 to be ON and controls the second switch unit 12 to be OFF. In this case, the voltage appearing across the two ends of the first switch unit 11 is $v_{S1u}=0$, as illustrated in FIG. 6(B), and the voltage appearing across the two ends of the second switch unit 12 is $v_{S2u}=v_{dc1}-v_{dc2}$, as illustrated in FIG. 6(C). As another example, when, as illustrated in FIG. 6(A), the triangular wave $v_{tri}$ is larger than the modulation wave d, the switch control unit 16 controls the first switch unit 11 to be OFF and controls the second switch unit 12 to be ON. In this case, the voltage appearing across the two ends of the first switch unit 11 is $v_{S1u}=v_{dc1}-v_{dc2}$, as illustrated in FIG. 6(B), and the voltage appearing across the two ends of the second switch unit 12 is $v_{S2u}=0$, as illustrated in FIG. 6(C).

The semiconductor power converter control unit 15 controls the power conversion operation of the semiconductor power converter 13 (auxiliary power converter 19) so that an inductor current $i_u$ containing a DC component and an AC component having a predetermined period flows through the inductor 14. Letting $I_{dc}$ (for $I_{dc}>0$) be the DC component of the inductor current $i_u$, $I_{ac}$ (for $I_{ac}>0$) be the AC component of the inductor current $i_u$, and $f_{SM}$ be the carrier frequency of the triangular wave $v_{tri}$, the inductor current $i_u$ is given by the following equation:
[Math. 1]

$$i_u = I_{ac} \sin\theta - I_{dc} = I_{ac} \sin 2\pi f_{SM} t - I_{dc} \quad (1)$$

The reason why the inductor current $i_u$ contains the DC component $I_{dc}$ and the AC component $I_{ac}$ will be given below.

Figure 13:
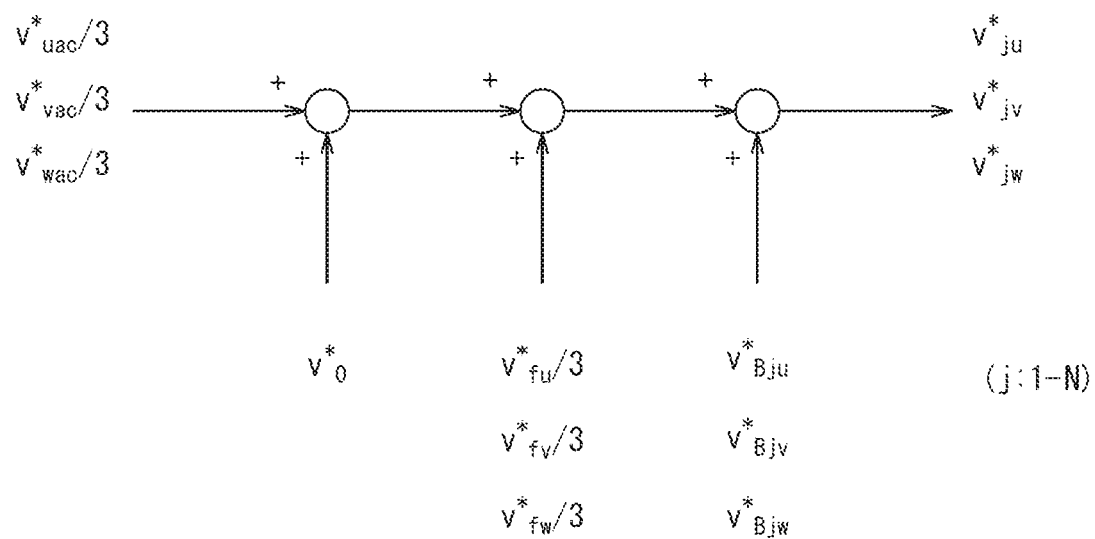
FIG. 13 is a block diagram illustrating a voltage command value issued to each semiconductor power converter (chopper cell) in the chopper circuit system formed by the three parallel-connected chopper circuits according to the first embodiment of the present disclosure.

As illustrated in FIG. 13 (to be described later), the voltage $v_u$ output from the auxiliary power converter 19 contains a voltage term $v_{fu}$ which outputs $v_{dc1}$ when the first switch unit 11 is ON and outputs $v_{dc2}$ when the second switch unit 12 is ON, as presented in equation (2) as feedforward control (FIG. 6(D)). The voltage term $v_{fu}$ is higher than the remaining voltage terms contained in the voltage $v_u$ output from the auxiliary power converter 19, and the voltage $v_u$ output from the auxiliary power converter 19, therefore, can be regarded to be nearly equal to the voltage term $v_{fu}$ ($v_u \approx v_{fu}$).

[Math. 2]

$$v_{fu} = \begin{cases} v_{dc1} & \text{(First Switch Unit: ON, and Second Switch Unit: OFF)} \\ v_{dc2} & \text{(First Switch Unit: OFF, and Second Switch Unit: ON)} \end{cases} \quad (2)$$

From equation (2) and FIG. 6(D), the voltage term $v_{fu}$ equivalently contains a DC voltage and an AC voltage having the same frequency as the carrier frequency $f_{SM}$.

To maintain the DC capacitor voltage of the capacitor C in each semiconductor power converter 13 constant in the auxiliary power converter 19, the auxiliary power converter 19 may be preferably controlled to adjust the power "$v_{fu} \times i_u$" of the auxiliary power converter 19 to zero on average. To attain this, the semiconductor power converter control unit 15 controls the power conversion operation of each semiconductor power converter 13 (auxiliary power converter 19) so that a current having the DC component $I_{dc}$ superimposed on the AC component $I_{ac}$ flows through the inductor 14 as the inductor current $i_u$. When, as illustrated in FIGS. 6(D) and 6(E), power flow is directed from the side of the first DC voltage $v_{dc1}$ to that of the second DC voltage $v_{dc2}$, since the AC components respectively contained in the voltage term $v_{fu}$ and the inductor current $i_u$ are in phase with each other, they form a positive active power "$v_{fu} \times i_u$." Therefore, as long as the DC components respectively contained in the voltage term $v_{fu}$ and the inductor current $i_u$ form a negative active power, the power "$v_{fu} \times i_u$" of the auxiliary power converter 19 can be adjusted to zero on average. Since, from FIG. 6(D) and equation (2), the DC component contained in the voltage term $v_{fu}$ is positive, the polarity of the DC component contained in the inductor current $i_u$ is negative.

When power flow is directed from the side of the second DC voltage $v_{dc2}$ to that of the first DC voltage $v_{dc1}$, the AC component contained in the inductor current $i_u$ is 180° out of phase with that when power flow is directed from the side of the first DC voltage $v_{dc1}$ to that of the second DC voltage $v_{dc2}$. In other words, since the AC components respectively contained in the voltage term $v_{fu}$ and the inductor current $i_u$ are opposite in phase to each other, they form a negative active power "$v_{fu} \times i_u$." Therefore, as long as the DC components respectively contained in the voltage term $v_{fu}$ and the inductor current $i_u$ form a positive active power, the power "$v_{fu} \times i_u$" of the auxiliary power converter 19 can be adjusted to zero on average. Since, from FIG. 6(D) and equation (2), the DC component contained in the voltage term $v_{fu}$ is negative, the polarity of the DC component contained in the inductor current $i_u$ is positive. Accordingly, when power flow is directed from the side of the second DC voltage $v_{dc2}$ to that of the first DC voltage $v_{dc1}$, the inductor current $i_u$ is given by the following equation:
[Math. 3]

$$i_u = -I_{ac} \sin\theta + I_{dc} = -I_{ac} \sin 2\pi f_{SM} t + I_{dc} \quad (3)$$

In the chopper circuit 1 illustrated in FIG. 1, let $\alpha$ (for $0<\alpha<\pi/2$) be the phase at the moment the inductor current $i_u$ changes from negative to positive, and $\pi-\alpha$ be the phase at the moment the inductor current $i_u$ changes from positive to negative. In one period ($0 \leq \theta \leq 2\pi$), when "$\alpha \leq \theta \leq \pi-\alpha$," since the first switch unit 11 is ON and the second switch unit 12 is OFF, the current flowing through the first switch unit 11 is $i_{u1}=i_u$, and the current flowing through the second switch unit 12 is $i_{u2}=0$, as illustrated in FIG. 6(F). When "$0 \leq \theta \leq \alpha$" and "$\pi-\alpha \leq \theta \leq 2\pi$," since the first switch unit 11 is OFF and the second switch unit 12 is ON, the current flowing through the first switch unit 11 is $i_{u1}=0$, and the current flowing through the second switch unit 12 is $i_{u2}=-i_u$, as illustrated in FIG. 6(F). From FIG. 6(E) and equation (1), the DC component $I_{dc}$ of the inductor current $i_u$ can be expressed using the AC component $I_{ac}$ and $\alpha$ as the following equation:
[Math. 4]

$$I_{dc} = I_{ac} \sin\alpha \quad (4)$$

As for the dead time during which both the first switch unit 11 and the second switch unit 12 are OFF, when the inductor current $i_u$ is positive ($i_u>0$), since a current flows via the feedback diode of the second switch unit 12, the current flowing through the first switch unit 11 is $i_{u1}=0$, and the current flowing through the second switch unit 12 is $i_{u2}=-i_u$. When the inductor current $i_u$ is negative ($i_u<0$), since a current flows via the feedback diode of the first switch unit 11, the current flowing through the first switch unit 11 is $i_{u1}=i_u$, and the current flowing through the second switch unit 12 is $i_{u2}=0$. From equations (1) and (3), equation (4) always holds even when the direction of power flow changes.

With attention being focused on the turn-on times and the turn-off times of the first switch unit 11 and the second switch unit 12, both the current $i_{u1}$ flowing through the first switch unit 11 and the current $i_{u2}$ flowing through the second switch unit 12 upon a change in voltage are zero. This means that the first switch unit 11 and the second switch unit 12 in an ideal state cause no switching losses.

The reason why the inductor current $i_u$ contains the DC component $I_{dc}$ and the AC component $I_{ac}$ has been given above.

A method for determining the modulation wave d and the phase $\alpha$ will be described subsequently. The following description assumes an ideal state in which each converter has zero loss. Letting $P_{dc1}$ be the average power on the side of the first DC voltage $v_{dc1}$, and $P_{dc2}$ be the average power on the side of the second DC voltage $v_{dc2}$, the following equation steadily holds between them:
[Math. 5]

$$P_{dc1}=P_{dc2} \qquad (5)$$

Letting $I_{u1}$ and $I_{u2}$ be the one-period averages of the current $i_{u1}$ flowing through the first switch unit 11 and the current $i_{u2}$ flowing through the second switch unit 12, respectively, the average power $P_{dc1}$ on the side of the first DC voltage $v_{dc1}$ and the average power $P_{dc2}$ on the side of the second DC voltage $v_{dc2}$ can be expressed as the following equations:
[Math. 6]

$$P_{dc1}=V_{dc1} \times I_{u1} \qquad (6)$$

[Math. 7]

$$P_{dc2}=V_{dc2} \times I_{u2} \qquad (7)$$

From FIG. 6(F) and equations (1) and (4), the current $i_{u1}$ flowing through the first switch unit 11 can be expressed as the following equation:

[Math. 8]

$$I_{u1} = \frac{1}{2\pi}\int_\alpha^{\pi-\alpha} i_u d\theta = \qquad (8)$$
$$\frac{1}{2\pi}\int_\alpha^{\pi-\alpha}(I_{ac}\sin\theta - I_{dc})d\theta = \frac{I_{ac}}{\pi}\cos\alpha - \frac{I_{ac}}{2}\sin\alpha + \frac{I_{ac}}{\pi}\alpha\sin\alpha$$

Similarly, from FIG. 6(F) and equations (1) and (4), the current $i_{u2}$ flowing through the second switch unit 12 can be expressed as the following equation:

[Math. 9]

$$I_{u2} = \frac{1}{2\pi}\left\{\int_{\pi-\alpha}^{2\pi+\alpha}(-i_u)d\theta\right\} = \qquad (9)$$
$$\frac{1}{2\pi}\left\{\int_{\pi-\alpha}^{2\pi+\alpha}(-I_{ac}\sin\theta + I_{dc})d\theta\right\} = \frac{I_{ac}}{\pi}\cos\alpha + \frac{I_{ac}}{2}\sin\alpha + \frac{I_{ac}}{\pi}\alpha\sin\alpha$$

From equations (5) to (9), the following equation holds for the phase $\alpha$:

[Math. 10]

$$\frac{V_{dc1}}{\pi}\cos\alpha - \frac{V_{dc1}}{2}\sin\alpha + \frac{V_{dc1}}{\pi}\alpha\sin\alpha = \qquad (10)$$
$$\frac{V_{dc2}}{\pi}\cos\alpha + \frac{V_{dc2}}{2}\sin\alpha + \frac{V_{dc2}}{\pi}\alpha\sin\alpha$$

As is obvious from equation (10), the phase $\alpha$ is determined by the first DC voltage $v_{dc1}$ and the second DC voltage $v_{dc2}$, and is independent of the AC component $I_{ac}$ of the inductor current $i_u$. This means that the phase $\alpha$ takes a value independent of the amount of power transmission.

To simplify equation (10), when approximations "sin $\alpha \approx \alpha$" and "cos $\alpha \approx 1-\alpha^2/2$" are applied, equation (10) can be rewritten as the following equation:

[Math. 11]

$$\alpha^2 - \pi\frac{V_{dc1}+V_{dc2}}{V_{dc1}-V_{dc2}}\alpha + 2 = 0 \qquad (11)$$

Equation (11) represents a quadratic equation for the phase $\alpha$, and solving equation (11) for the phase $\alpha$ yields the following equation:

[Math. 12]

$$\alpha = \frac{\pi}{2}\frac{V_{dc1}+V_{dc2}}{V_{dc1}-V_{dc2}} \pm \frac{1}{2}\sqrt{\pi^2\left(\frac{V_{dc1}+V_{dc2}}{V_{dc1}-V_{dc2}}\right)^2 - 8} \qquad (12)$$

From the phase-related condition "$0<\alpha<\pi/2$," the phase $\alpha$ can be expressed as the following equation:

[Math. 13]

$$\alpha = \frac{\pi}{2}\frac{V_{dc1}+V_{dc2}}{V_{dc1}-V_{dc2}} - \frac{1}{2}\sqrt{\pi^2\left(\frac{V_{dc1}+V_{dc2}}{V_{dc1}-V_{dc2}}\right)^2 - 8} \qquad (13)$$

Referring to FIG. 6(A), the slope of the triangular wave $v_{tri}$ in the interval from a phase of $\pi/2$ to a phase of $3\pi/2$ is "$1/\pi$," and the value of the triangular wave $v_{tri}$ at a phase of $\pi$ is "0.5." The value of the triangular wave $v_{tri}$ at a phase of $\pi-\alpha$ is "d." From these relationships, d can be expressed as the following equation:

[Math. 14]

$$d = 0.5 - \frac{\alpha}{\pi} \qquad (14)$$

As described above, the modulation wave d is determined based on equation (14), and the phase $\alpha$ is determined based on equation (13). When the triangular wave $v_{tri}$ is smaller than the modulation wave d determined based on equation (14), the switch control unit 16 controls the first switch unit 11 to be ON and controls the second switch unit 12 to be OFF. When the triangular wave $v_{tri}$ is larger than the modulation wave d determined based on equation (14), the switch control unit 16 controls the first switch unit 11 to be OFF and controls the second switch unit 12 to be ON. The switch control unit 16 performs switching from ON to OFF and switching from OFF to ON for the first switch unit 11 and the second switch unit 12, at the phases α and π–α in which the current output from the semiconductor power converter 13 is controlled to be zero by the semiconductor power converter control unit 15.

The above-mentioned method for determining the phase α assumes an ideal state in which each converter has zero loss. In the ideal state, when the phase of the current output from the semiconductor power converter 13 by the semiconductor power converter control unit 15 is α and π–α, this current output from the semiconductor power converter 13 is zero. In an actual chopper circuit 1, however, since each converter in the chopper circuit 1 has any loss, even when the phase of the current output from the semiconductor power converter 13 by the semiconductor power converter control unit 15 is α and π–α, this current output from the semiconductor power converter 13 is not zero, and a minute current flows. In view of this, the switch control unit 16 performs switching from ON to OFF and switching from OFF to ON for the first switch unit 11 and the second switch unit 12, at the phases α and π–α in which the current output from the semiconductor power converter 13 is controlled to be equal to or lower than a predetermined value by the semiconductor power converter control unit 15. The predetermined value means herein a value sufficiently smaller than the rated current of the semiconductor power converter 13. As one example, the predetermined value is set to a value of, e.g., about 0% to 10% of the rated current of the semiconductor power converter 13, but it may be set to a value larger than 10% of the rated current of the semiconductor power converter 13, depending on the environment under which the chopper circuit 1 is applied.

Figure 7:
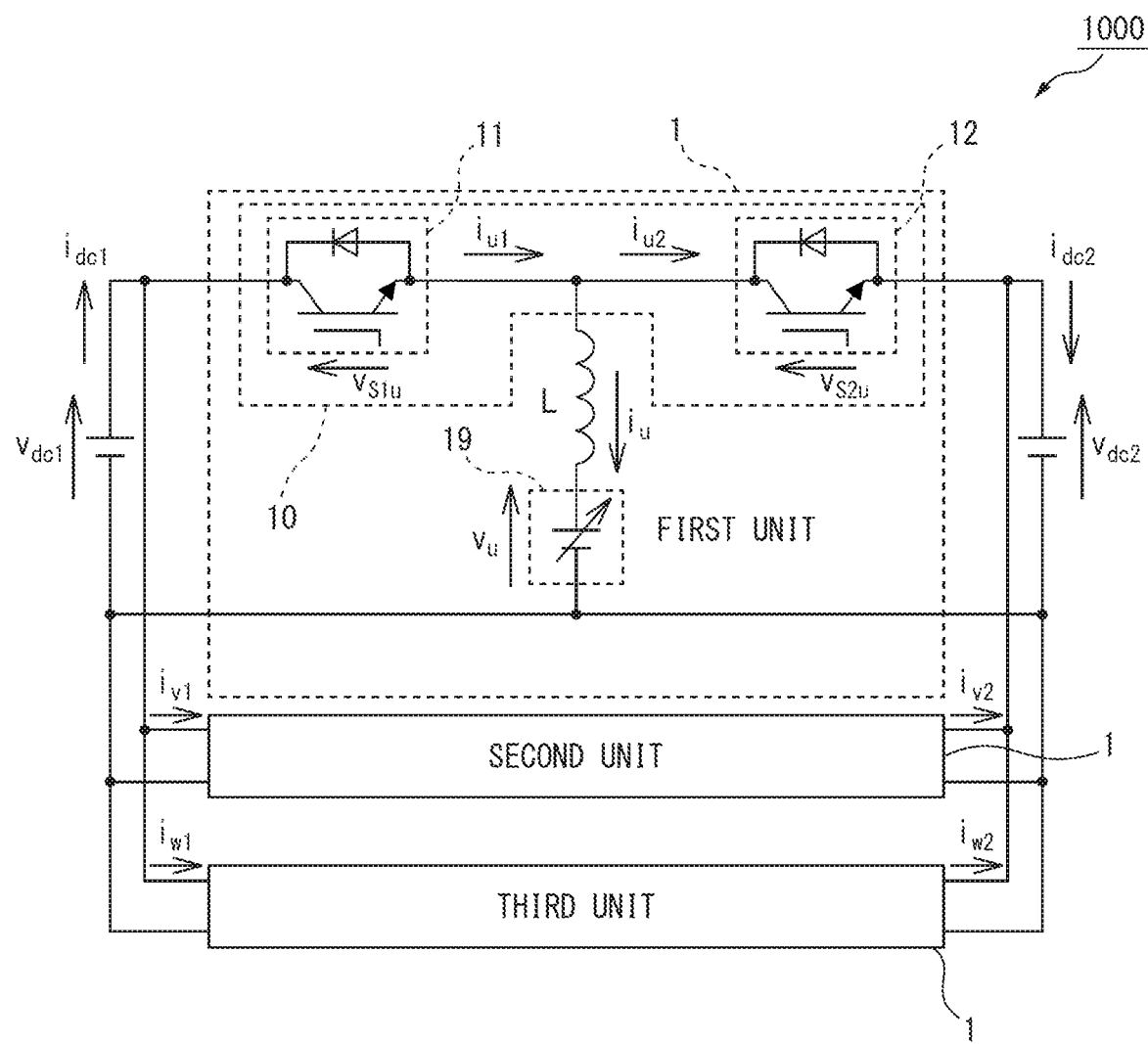
FIG. 7 is a circuit diagram illustrating a chopper circuit system formed by parallel-connected chopper circuits according to the first embodiment of the present disclosure.

In applying the chopper circuit 1 illustrated in FIG. 1 in practice, the chopper circuit 1 is assumed to be applied in a chopper circuit system (DC/DC converter system) equipped with parallel-connected chopper circuits 1, aiming at DC current smoothing and an increase in converter capacity. FIG. 7 is a circuit diagram illustrating a chopper circuit system formed by parallel-connected chopper circuits according to the first embodiment of the present disclosure.

As illustrated in FIG. 7, a chopper circuit system 1000 is formed by chopper circuits 1 connected in parallel with each other. The number of chopper circuits 1 is represented by the number of units M (where M is a natural number), and the respective chopper circuits 1 are represented as a first unit, a second unit, . . . , an Mth unit. The auxiliary power converter 19 in each chopper circuit 1 is represented as an equivalent controlled voltage source $v_u$. Each unit (chopper circuit 1) is connected in parallel with a common DC power supply $v_{dc1}$ on the high-voltage side, and connected in parallel with a common DC power supply $v_{dc2}$ on the low-voltage side. The triangular wave initial phase of the main power converter 10 in each unit is shifted by 180/M degrees for each unit. The phase of each inductor current $i_u$ is similarly shifted by 180/M degrees.

Control of a chopper circuit system 1000 including three chopper circuits 1 (Number of Units M=3) will be described below. When the number of units M is other than three as well, a control system can be similarly formed, i.e., the following description is applicable.

When the number of units is M=3, since the chopper circuit system 1000 performs an operation similar to that of a three-phase power converter, the first unit of the chopper circuit 1 will be referred to as a u-phase power converter hereinafter, the second unit of the chopper circuit 1 will be referred to as a v-phase power converter hereinafter, and the third unit of the chopper circuit 1 will be referred to as a w-phase power converter hereinafter, for the sake of convenience. Note, however, that the u, v, and w phases of the chopper circuit system 1000 are different in meaning from the original u, v, and w phases of the three-phase power converter.

The control system of the chopper circuit system 1000 is formed by an inductor current control system (power control system) and a DC capacitor voltage control system.

The configuration of the inductor current control system (power control system) of the chopper circuit system 1000 will be described first.

The inductor current control system of the chopper circuit system 1000 can employ a current control system based on coordinate transformation generally applied in a power conversion system. Let $i_u$, $i_v$, and $i_w$ be the inductor currents of the respective phases. The inductor currents $i_u$, $i_v$, and $i_w$ of the respective phases are formed by a positive-phase-sequence current and a negative-phase-sequence current which are 120° out of phase with each other, and an in-phase, zero-phase-sequence current. A d-axis current $i_d$ and a q-axis current $i_q$ can be calculated by applying d-q coordinate transformation to the inductor currents $i_u$, $i_v$, and $i_w$ of the respective phases. A zero-phase-sequence current $i_0$ is calculated as the following equation:

[Math. 15]

$$i_0 = \tfrac{1}{3}(i_u + i_v + i_w) \quad (15)$$

As a characteristic feature, the calculation of the d-axis current $i_d$ and the q-axis current $i_q$ uses a reference sinusoidal wave having the same frequency $f_{SM}$ as that of the triangular wave $v_{tri}$ applied to the first switch unit 11 and the second switch unit 12 in the chopper circuit 1. More specifically, a sinusoidal current having a frequency of 50 [Hz] or 60 [Hz] is controlled in a general power conversion system, while a sinusoidal current having the carrier frequency $f_{SM}$ (e.g., on the order of several hundred hertz or more) is controlled in the chopper circuit system 1000. In the chopper circuit system 1000, the d-axis current $i_d$ represents a current component contributing to power transmission between the first DC voltage $v_{dc1}$ and the second DC voltage $v_{dc2}$, and the q-axis current $i_q$ represents a current component which does not contribute to power transmission between the first DC voltage $v_{dc1}$ and the second DC voltage $v_{dc2}$. In other words, the d-axis current $i_d$ of the chopper circuit system 1000 corresponds to an active current in the general power conversion system, and the q-axis current $i_q$ of the chopper circuit system 1000 corresponds to a reactive current in the general power conversion system.

Figure 8:
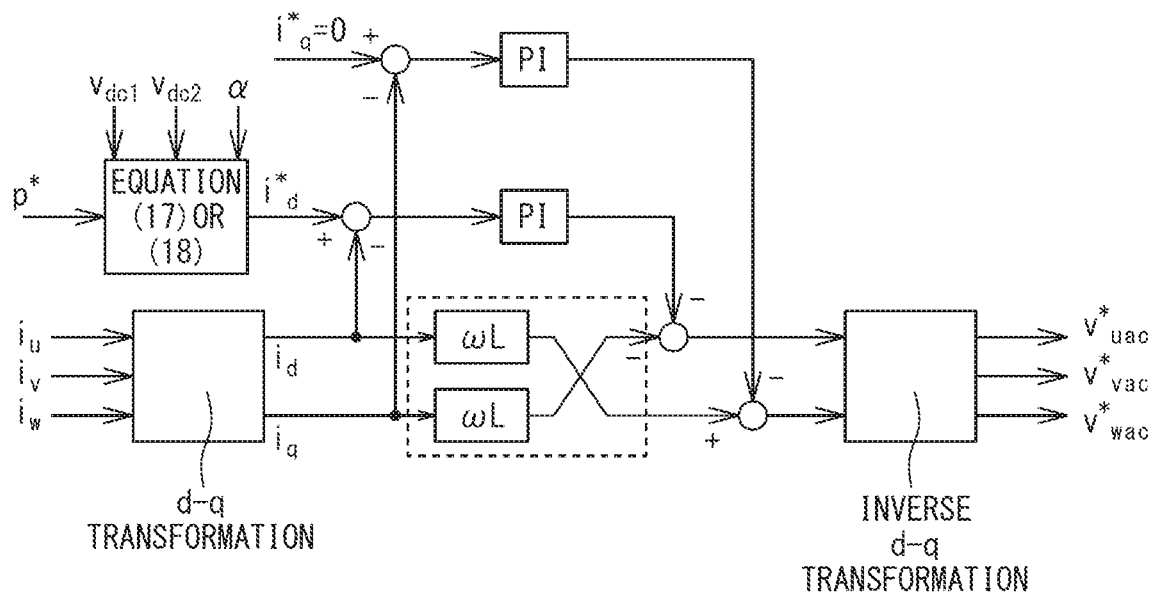
FIG. 8 is a block diagram illustrating a positive-phase-sequence current control system in a chopper circuit system formed by three parallel-connected chopper circuits according to the first embodiment of the present disclosure.

Control of the d-axis current $i_d$ and the q-axis current $i_q$ in the chopper circuit system 1000 is implemented by employing decoupling current control normally applied in the general power conversion system. FIG. 8 is a block diagram illustrating a positive-phase-sequence current control system in a chopper circuit system formed by three parallel-connected chopper circuits according to the first embodiment of the present disclosure. A command value $i_q^*$ for the q-axis current $i_q$ that does not contribute to power transmission between the first DC voltage $v_{dc1}$ and the second DC voltage $v_{dc2}$ is always set to zero ($i_q^*=0$). A command value $i_d^*$ for the d-axis current $i_d$ contributing to power transmission between the first DC voltage $v_{dc1}$ and the second DC voltage $v_{dc2}$ is determined by a power flow command value p* issued from the side of the first DC voltage vdc to that of the second DC voltage $v_{dc2}$. From equations (6) and (8), the average power on the side of the first DC voltage $v_{dc1}$ is given by the following equation:

[Math. 16]

$$P_{dc1} = 3V_{dc1}I_{u1} = \frac{3V_{dc1}I_{ac}}{\pi}\cos\alpha - \frac{3V_{dc1}I_{ac}}{2}\sin\alpha + \frac{3V_{dc1}I_{ac}}{\pi}\alpha\sin\alpha \quad (16)$$

The coefficient of 3 in equation (16) represents the sum power of the chopper circuits 1 corresponding to the three phases (three chopper circuits). Further, equation (16) assumes that the current $i_{u1}$ flowing through the first switch unit in the chopper circuit 1 of the first unit, the current $i_{v1}$ flowing through the first switch unit in the chopper circuit 1 of the second unit, and the current $i_{w1}$ flowing through the first switch unit in the chopper circuit 1 of the third unit are equal in one-period average to each other ($I_{u1}=I_{v1}=I_{w1}$). Again, in equation (16), a relation "$i_d=\sqrt{(3/2)}\times I_{ac}$" holds between the AC components $I_{ac}$ of the inductor currents $i_u$, $i_v$, and $i_w$ and the d-axis current $i_d$. Accordingly, the relationship between the power flow command value p* and the d-axis current command value $i_d^*$ is given by the following equation:

[Math. 17]

$$i_d^* = \sqrt{\frac{3}{2}}\left\{p^*\bigg/\left(\frac{3V_{dc1}}{\pi}\cos\alpha - \frac{3V_{dc1}}{2}\sin\alpha + \frac{3V_{dc1}}{\pi}\alpha\sin\alpha\right)\right\} \quad (17)$$

In equation (17), the d-axis current command value $i_d^*$ is calculated from the power on the side of the first DC voltage $v_{dc1}$, but the d-axis current command value $i_d^*$ can also be calculated from the power on the side of the second DC voltage $v_{dc2}$. More specifically, from equations (7) and (9), the relationship between the power flow command value p* and the d-axis current command value $i_d^*$ is given by the following equation:

[Math. 18]

$$i_d^* = \sqrt{\frac{3}{2}}\left\{p^*\bigg/\left(\frac{3V_{dc2}}{\pi}\cos\alpha + \frac{3V_{dc3}}{2}\sin\alpha + \frac{3V_{dc2}}{\pi}\alpha\sin\alpha\right)\right\} \quad (18)$$

The configuration of the inductor current control system (power control system) of the chopper circuit system 1000 has been described above.

The configuration of the DC capacitor voltage control system of the chopper circuit system 1000 will be described subsequently.

With attention being focused on the operation of the auxiliary power converter 19 in the chopper circuit 1 illustrated in FIG. 1, the auxiliary power converter 19 absorbs power from the side of the first DC voltage $v_{dc1}$ when the first switch unit 11 is ON and the second switch unit 12 is OFF, and the auxiliary power converter 19 emits power to the side of the second DC voltage $v_{dc2}$ when the first switch unit 11 is OFF and the second switch unit 12 is ON. In a steady state, since the relationship presented in equation (5) holds, the one-period average of the power flowing into and out of the auxiliary power converter 19 is zero. In other words, since steady power inflow and outflow do not occur in the auxiliary power converter 19, the DC component of the DC capacitor voltage in the capacitor within each semiconductor power converter 13 (chopper cell) ideally does not vary. Since, however, this DC component varies due to the influence of transient variations or converter losses in practice, DC capacitor voltage control may be preferably applied to the capacitor in each semiconductor power converter 13 (chopper cell).

The DC capacitor voltage control system of the chopper circuit system 1000 is formed by a DC voltage collective control system, an interphase balance control system, a zero-phase-sequence current control system, and an intercell balance control system.

Figure 9:
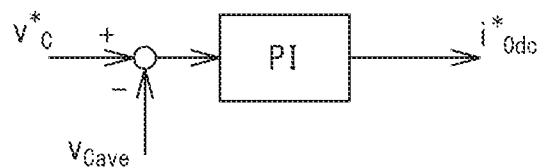
FIG. 9 is a block diagram illustrating a DC voltage collective control system within a DC capacitor voltage control system in the chopper circuit system formed by the three parallel-connected chopper circuits according to the first embodiment of the present disclosure.

FIG. 9 is a block diagram illustrating a DC voltage collective control system within a DC capacitor voltage control system in the chopper circuit system formed by the three parallel-connected chopper circuits according to the first embodiment of the present disclosure. The DC voltage collective control system forms a feedback loop which allows an arithmetic mean $v_{Cave}$ of DC capacitor voltages used for all the semiconductor power converters 13 (chopper cells) in the chopper circuit system 1000 to follow a command value $v_C^*$. More specifically, this configuration is implemented by adjusting a DC component $i_{0dc}$ contained in a zero-phase-sequence current $i_0$. $v_{Cave}$ is given by the following equation:

[Math. 19]

$$v_{Cave} = \frac{1}{3}(v_{Cuave} + v_{Cvave} + V_{Cwave}) \quad (19)$$

where $v_{Cuave}$, $v_{Cvave}$, and $v_{Cwave}$ represent the arithmetic means of DC capacitor voltages used for the respective phases, and are given by the following set of equations, respectively:

[Math. 20]

$$v_{Cuave} = \frac{1}{N}\sum_{n=1}^{N}v_{Cnu} \quad (20)$$

$$v_{Cvave} = \frac{1}{N}\sum_{n=1}^{N}v_{Cnv}$$

$$v_{Cwave} = \frac{1}{N}\sum_{n=1}^{N}v_{Cnw}$$

When "$v_C^* > v_{Cave}$," since a command value $i_{0dc}^*$ for the DC component $i_{0dc}$ contained in the zero-phase-sequence current $i_0$ increases, the active power flowing into each semiconductor power converter 13 (chopper cell) also increases. As a result, the DC capacitor voltage of the capacitor in each semiconductor power converter 13 increases. When "$v_C^* < v_{Cave}$," since the command value $i_{0dc}^*$ for the DC component $i_{0dc}$ contained in the zero-phase-sequence current $i_0$ decreases, the active power flows out of each semiconductor power converter 13 (chopper cell). As a result, the DC capacitor voltage of the capacitor in each semiconductor power converter 13 decreases.

Figure 10:
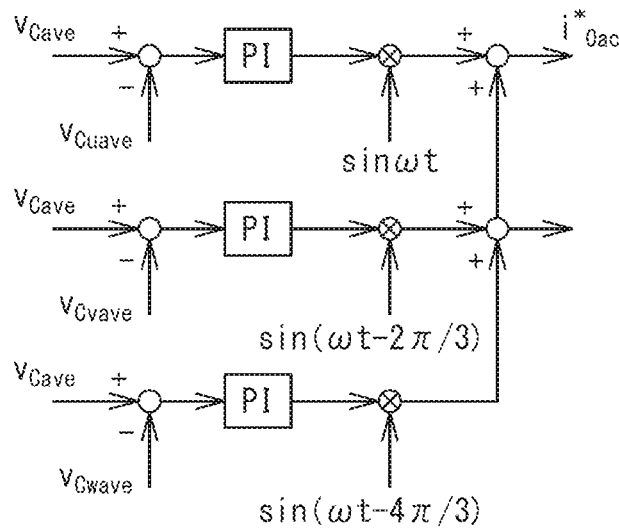
FIG. 10 is a block diagram illustrating an interphase balance control system within the DC capacitor voltage control system in the chopper circuit system formed by the three parallel-connected chopper circuits according to the first embodiment of the present disclosure.

FIG. 10 is a block diagram illustrating an interphase balance control system within the DC capacitor voltage control system in the chopper circuit system formed by the three parallel-connected chopper circuits according to the first embodiment of the present disclosure. The interphase balance control system is implemented using a carrier frequency component $i_{0ac}$ contained in the zero-phase-sequence current $i_0$. Referring to FIG. 10, sin ωt represents a component in phase with the inductor current $i_u$ in the chopper circuit 1 of the first unit, sin(ωt−2π/3) represents a component in phase with the inductor current $i_v$ in the chopper circuit 1 of the second unit, and sin(ωt−4π/3) represents a component in phase with the inductor current $i_w$ in the chopper circuit 1 of the third unit. When, for example, "$v_{Cave} > v_{Cuave}$," a command value $i_{0ac}^*$ for the carrier frequency component $i_{0ac}$ contained in the zero-phase-sequence current $i_0$ generates a component in phase with the inductor current $i_u$ in the chopper circuit 1 of the first unit, as is obvious from FIG. 10. In this case, $v_{Cave}$ increases as the carrier frequency component $i_{0ac}$ contained in the zero-phase-sequence current $i_0$ forms a positive active power with the AC component contained in the voltage term $v_{fu}$ in FIG. 6. The same applies to the remaining phases (the chopper circuits 1 of the remaining units).

Figure 11:
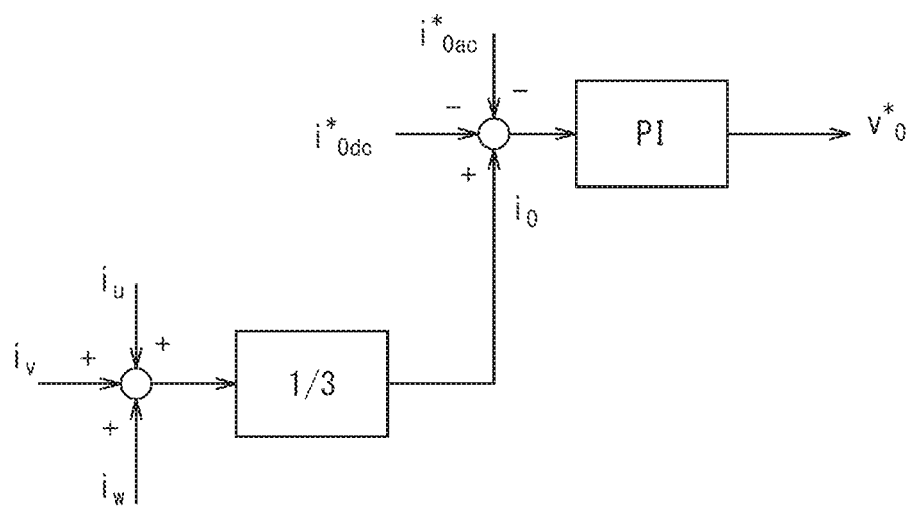
FIG. 11 is a block diagram illustrating a zero-phase-sequence current control system within the DC capacitor voltage control system in the chopper circuit system formed by the three parallel-connected chopper circuits according to the first embodiment of the present disclosure.

FIG. 11 is a block diagram illustrating a zero-phase-sequence current control system within the DC capacitor voltage control system in the chopper circuit system formed by the three parallel-connected chopper circuits according to the first embodiment of the present disclosure. The zero-phase-sequence current control system forms a feedback loop which allows the zero-phase-sequence current $i_0$ to follow a command value "$i_{0dc}^* + i_{0ac}^*$," and generates a voltage command value $v_0^*$ common to each phase (each unit).

Figure 12:
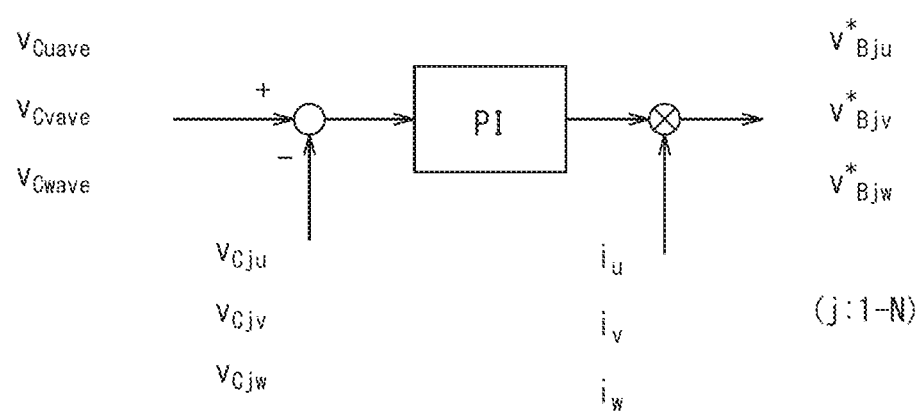
FIG. 12 is a block diagram illustrating an individual balance control system within the DC capacitor voltage control system in the chopper circuit system formed by the three parallel-connected chopper circuits according to the first embodiment of the present disclosure.

FIG. 12 is a block diagram illustrating an individual balance control system within the DC capacitor voltage control system in the chopper circuit system formed by the three parallel-connected chopper circuits according to the first embodiment of the present disclosure. The individual balance control system achieves a voltage balance by forming an active power between the inductor current and the voltage output from each semiconductor power converter 13 (chopper cell).

FIG. 13 is a block diagram illustrating a voltage command value issued to each semiconductor power converter (chopper cell) in the chopper circuit system formed by the three parallel-connected chopper circuits according to the first embodiment of the present disclosure. Referring to FIG. 13, $v_{fu}^*$, $v_{fv}^*$, and $v_{fw}^*$ represent the voltage command values of a feedforward term, and $v_{fu}^*$, for example, is given by the following equation:

[Math. 2]

$$v_{fu}^* = \begin{cases} v_{dc1} & \text{(First Switch Unit: ON, and Second Switch Unit: OFF)} \\ v_{dc2} & \text{(First Switch Unit: OFF, and Second Switch Unit: ON)} \end{cases} \quad (21)$$

However, the dead time during which both the first switch unit 11 and the second switch unit 12 are OFF is set to "$v_{fu}^* = v_{dc2}$" when the inductor current $i_u$ is higher than zero ($i_u > 0$), and set to "$v_{fu}^* = v_{dc1}$" when the inductor current $i_u$ is lower than zero ($i_u < 0$). Each of chopper cell voltage command values $v_{fu}^*$, $v_{fv}^*$, and $v_{fw}^*$ (j: 1–N) is normalized by the DC capacitor voltage and then compared with a triangular wave having a carrier frequency $f_{SA}$ and taking a maximum value of 1 and a minimum value of 0.

The configuration of the DC capacitor voltage control system of the chopper circuit system 1000 has been described above.

A simulation result for the chopper circuit system 1000 will be described subsequently.

FIG. 14 is a table illustrating circuit constants used for simulation of the chopper circuit system formed by the three parallel-connected chopper circuits according to the first embodiment of the present disclosure, in which the simulation used "PSCAD/EMTDC." The number of units M of the chopper circuit system 1000 was three, and the number (the number of chopper cells) N of semiconductor power converters 13 provided in the chopper circuit 1 serving as each unit was set to three. The first DC voltage $v_{dc1}$ was set to 1.5 [kV], the second DC voltage $v_{dc2}$ was set to 0.75 [kV], and the DC capacitor voltage $V_C$ of the capacitor in each semiconductor power converter 13 (chopper cell) was set to 0.6 [kV]. The carrier frequency $f_{SM}$ of the main power converter 10 in each unit was set to 450 [Hz], and the carrier frequency $f_{SA}$ of the auxiliary power converter 19 was set to 10 [kHz]. Since phase shift PWM is applied to each chopper cell, the equivalent carrier frequency of the auxiliary power converter 19 is 30 [kHz] (=$Nf_{SA}$). This simulation aims to confirm the principle, and therefore assumes an ideal state. In other words, assuming an analog control system having zero control delay, ideal switches having zero dead time were used.

Figure 15:
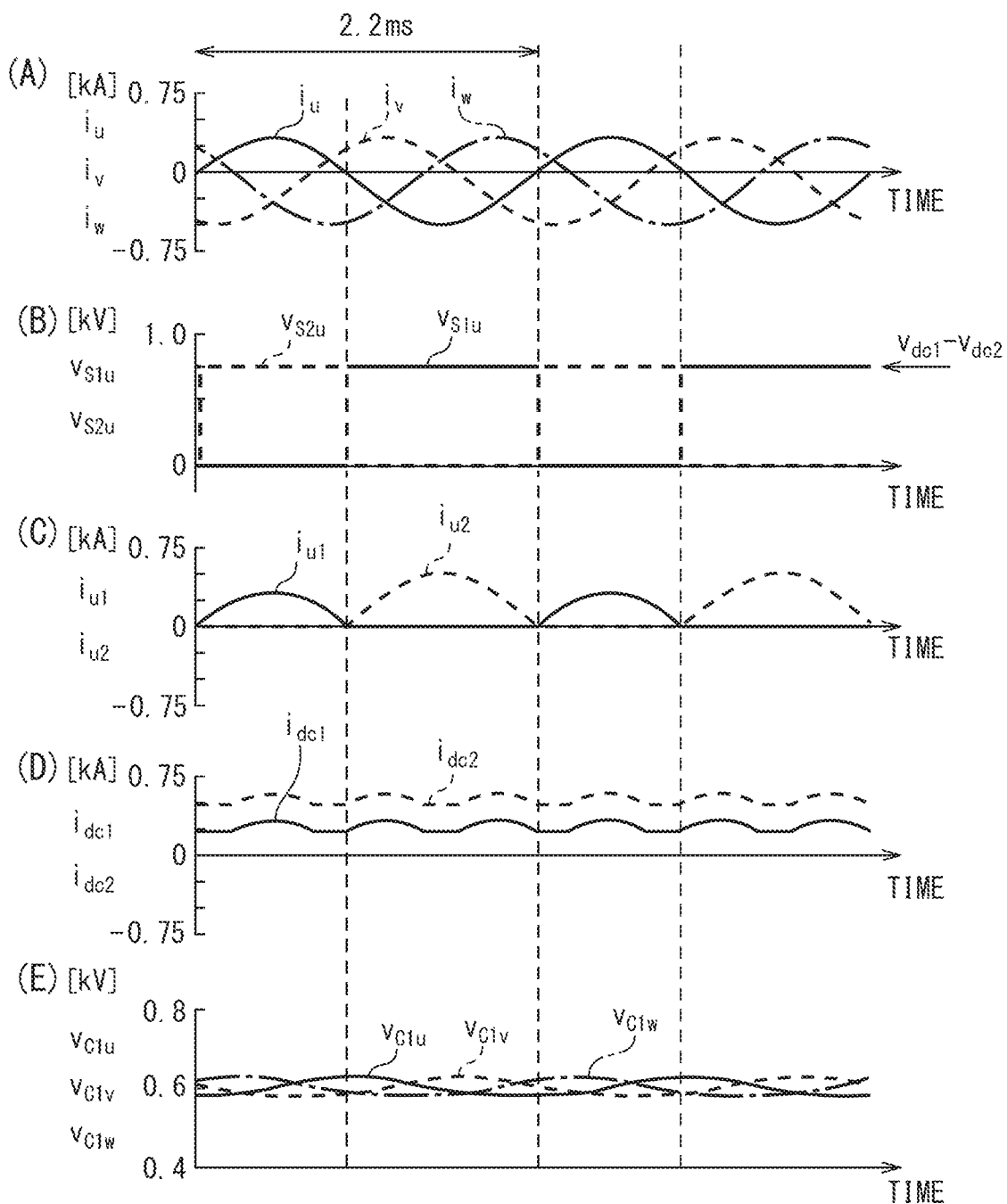
FIG. 15 illustrates graphs of simulated waveforms when a power of 400 [kW] is transmitted from a first DC voltage side to a second DC voltage side in the chopper circuit system formed by the three parallel-connected chopper circuits according to the first embodiment of the present disclosure, and depicts in (A), inductor currents for respective units; in (B), voltages respectively appearing across the two ends of a first switch unit and the two ends of a second switch unit in a first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for capacitors in the semiconductor power converters (chopper cells).

FIG. 15 illustrates graphs of simulated waveforms when a power of 400 [kW] is transmitted from a first DC voltage side to a second DC voltage side in the chopper circuit system formed by the three parallel-connected chopper circuits according to the first embodiment of the present disclosure, and depicts in (A), inductor currents for respective units; in (B), voltages respectively appearing across the two ends of a first switch unit and the two ends of a second switch unit in a first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for capacitors in the semiconductor power converters (chopper cells).

With attention being focused on the inductor currents $i_u$, $i_v$, and $i_w$ illustrated in FIG. 15(A), a negative DC current is obviously superimposed on an AC component having a frequency of 450 [Hz]. The AC component having a frequency of 450 [Hz] has a sinusoidal waveform, and contains little harmonic current. With attention being focused on the voltages (semiconductor valve device forward voltages) $v_{S1u}$ and $v_{S2u}$ respectively appearing across the two ends of the first switch unit 11 and the two ends of the second switch unit 12 in the first unit illustrated in FIG. 15(B), when $v_{S1u}=0$, i.e., when the first switch unit 11 is ON, the current flowing through the first switch unit 11 is $i_{u1}=i_u$ and the current flowing through the second switch unit 12 is $i_{u2}=0$, as illustrated in FIG. 15(C), and when "$v_{S1u}=v_{dc1}-v_{dc2}=750$ [V]," i.e., when the second switch unit 12 is ON, the current flowing through the first switch unit 11 is $i_{u1}=0$ and the current flowing through the second switch unit 12 is $i_{u2}=-i_u$, as illustrated in FIG. 15(C). This simulation result reveals that giving the modulation factor d presented in equation (12) makes it possible to implement soft switching operations (i.e., switching operations at the timings at which the flowing currents are kept equal to or lower than a very small predetermined value (e.g., zero)) for both the turn-off times and the turn-on times in the first switch unit 11 and the second switch unit 12. Hence, no switching losses occur in the first switch unit 11 and the second switch unit 12.

With attention being focused on the current $i_{dc1}$ flowing on the side of the first DC voltage $v_{dc1}$ and the current $i_{dc2}$ flowing on the side of the second DC voltage $v_{dc2}$ in the chopper circuit system 1000 illustrated in FIG. 15(D), summation of the individual currents of the chopper circuit 1 of the first unit, the chopper circuit 1 of the second unit, and the chopper circuit 1 of the third unit obviously brings the currents $i_{dc1}$ and $i_{dc2}$ closer to DC currents, compared to the DC current of only one chopper circuit 1 used alone. Obviously as well, a stepwise change in current occurring in the conventional chopper circuit does not occur in the chopper circuit system 1000. Therefore, no overvoltages resulting from the stepwise current occur in the chopper circuit system 1000.

Again, obviously, each of the DC capacitor voltages $v_{C1u}$, $v_{C1v}$, and $v_{C1w}$ of the capacitors in the semiconductor power converters 13 (chopper cells) illustrated in FIG. 15(E) contains DC and AC components, and the DC component of these components satisfactorily follows 600 [V] that is the command value. Again, obviously, as for the AC component, an AC component having a frequency of 450 [Hz] is present, but its magnitude is sufficiently lower than that of the DC component.

Figure 16:
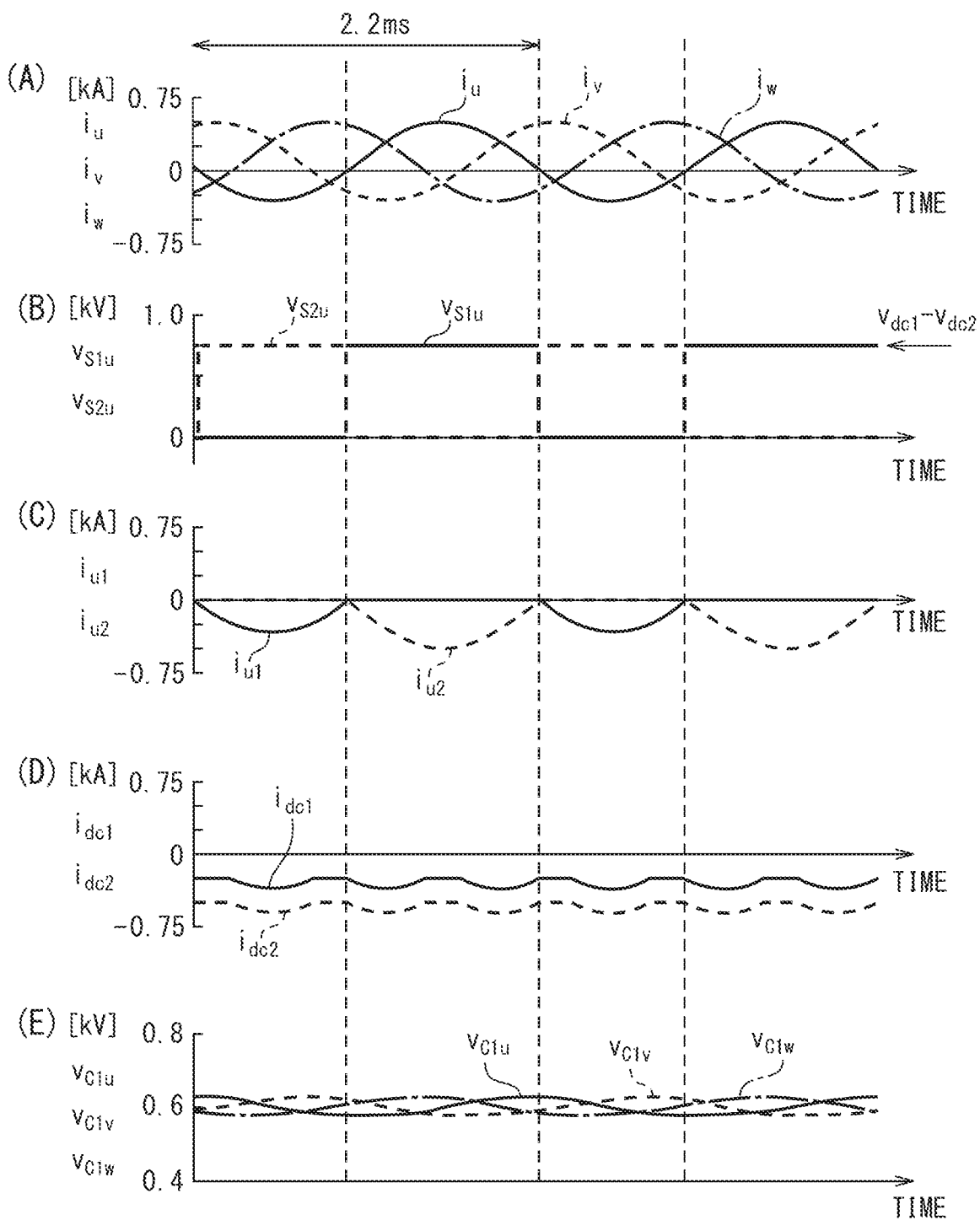
FIG. 16 illustrates graphs of simulated waveforms when a power of 400 [kW] is transmitted from the second DC voltage side to the first DC voltage side in the chopper circuit system formed by the three parallel-connected chopper circuits according to the first embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

FIG. 16 illustrates graphs of simulated waveforms when a power of 400 [kW] is transmitted from the second DC voltage side to the first DC voltage side in the chopper circuit system formed by the three parallel-connected chopper circuits according to the first embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells). In other words, FIG. 16 illustrates a simulation result obtained when power is transmitted in the direction (from the second DC voltage side to the first DC voltage side) opposite to that in the above-mentioned simulation of FIG. 15.

With attention being focused on the inductor currents $i_u$, $i_v$, and $i_w$ illustrated in FIG. 16(A), a positive DC current is obviously superimposed on an AC component having a frequency of 450 [Hz]. Obviously as well, even when the direction of power transmission changes from that in FIG. 15, the phase α presented in equation (11) does not change. In other words, again, obviously, soft switching operations (i.e., switching operations at the timings at which the flowing currents are kept equal to or lower than a very small predetermined value (e.g., zero)) can be implemented for both the turn-off times and the turn-on times in the first switch unit 11 and the second switch unit 12. Other simulated waveforms are the same as those illustrated in FIG. 15.

Figure 17:
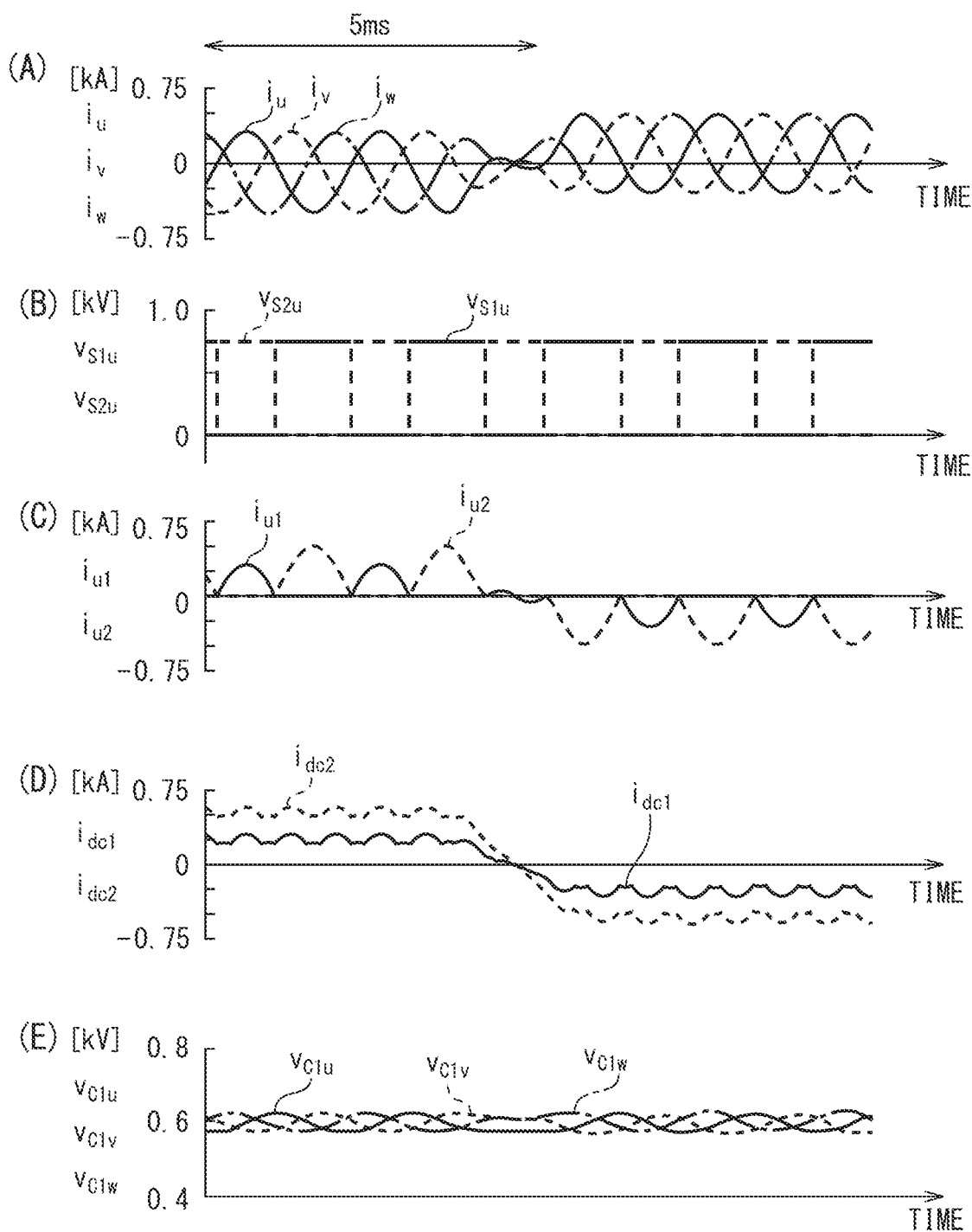
FIG. 17 illustrates graphs of simulated waveforms when the direction to transmit a power of 400 [kW] is reversed between the first DC voltage side and the second DC voltage side at a time instant of 5 ms in the chopper circuit system formed by the three parallel-connected chopper circuits according to the first embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

FIG. 17 illustrates graphs of simulated waveforms when the direction to transmit a power of 400 [kW] is reversed between the first DC voltage side and the second DC voltage side at a time instant of 5 ms in the chopper circuit system formed by the three parallel-connected chopper circuits according to the first embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

As illustrated in FIG. 17, obviously, even when the direction of power transmission is rapidly changed at a time instant of 5 ms, the chopper circuit system 1000 satisfactorily operates without causing overvoltages and overcurrents. This reveals that the auxiliary power converter 19 has a high-speed current control function.

The chopper circuit according to the first embodiment of the present disclosure has been described above. A chopper circuit according to a second embodiment of the present disclosure will be described subsequently.

Figure 18:
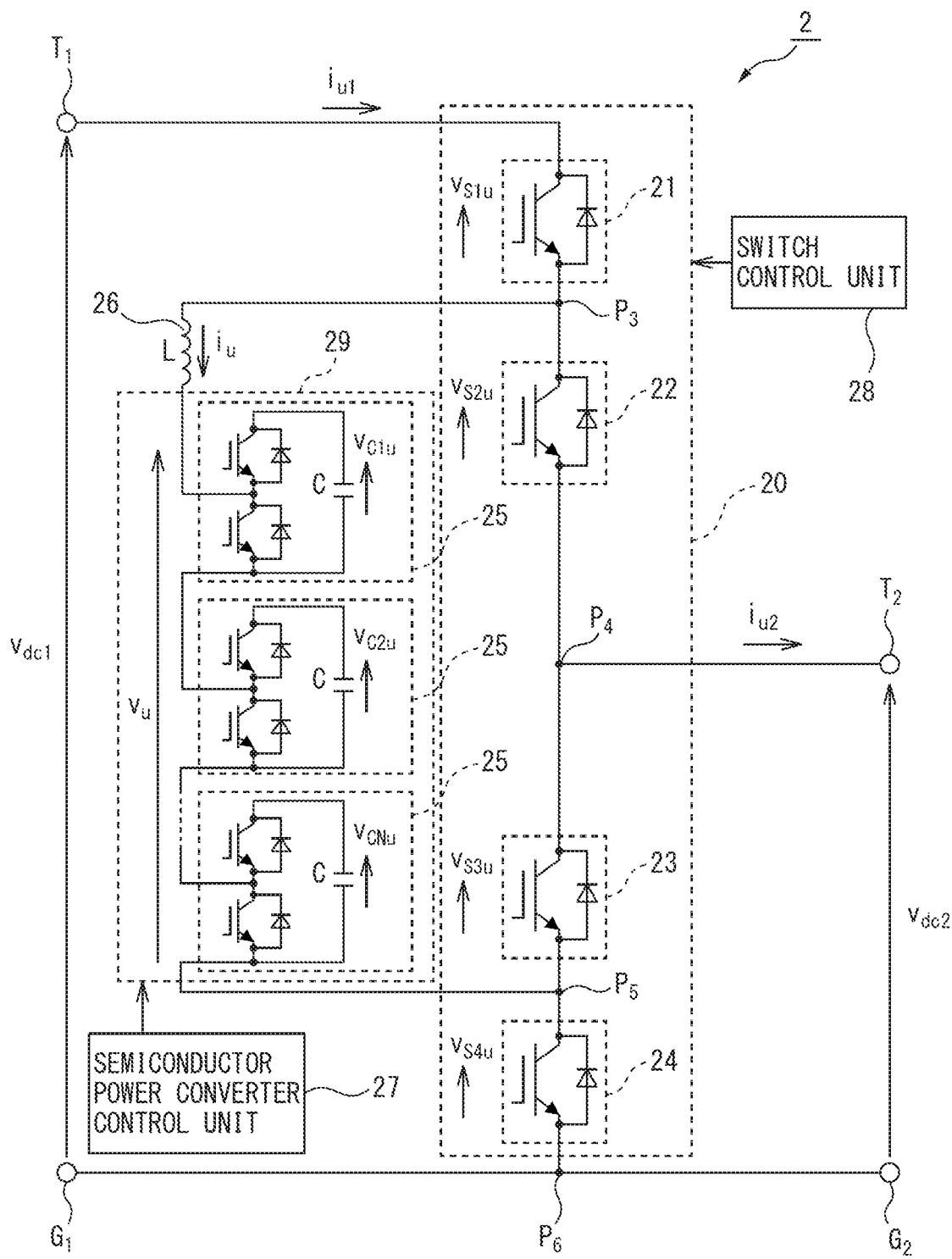
FIG. 18 is a circuit diagram illustrating a chopper circuit according to a second embodiment of the present disclosure.

FIG. 18 is a circuit diagram illustrating a chopper circuit according to a second embodiment of the present disclosure.

A chopper circuit 2 according to the second embodiment of the present disclosure bidirectionally converts a voltage between a first DC voltage $v_{dc1}$ across a pair of first external connection terminals $T_1$ and $G_1$ and a second DC voltage $v_{dc2}$ across a pair of second external connection terminals $T_2$ and $G_2$. A DC power supply is connected to one of a set of the first external connection terminals $T_1$ and $G_1$ and a set of the second external connection terminals $T_2$ and $G_2$, and a load or another DC power supply is connected to the other set of external connection terminals.

When, for example, a DC power supply is connected to the first external connection terminals $T_1$ and $G_1$, and a load is connected to the second external connection terminals $T_2$ and $G_2$, the chopper circuit 2 operates as a step-down chopper. In this case, a voltage output from the DC power supply is used as the first DC voltage $v_{dc1}$, and a voltage applied to the load is used as the second DC voltage $v_{dc2}$.

When, as another example, a load is connected to the first external connection terminals $T_1$ and $G_1$, and a DC power supply is connected to the second external connection terminals $T_2$ and $G_2$, the chopper circuit 2 operates as a step-up chopper. In this case, a voltage applied to the load is used as the first DC voltage $v_{dc1}$, and a voltage output from the DC power supply is used as the second DC voltage $v_{dc2}$.

As still another example, a DC power supply may be connected to the first external connection terminals $T_1$ and $G_1$, and another DC power supply may be connected to the second external connection terminals $T_2$ and $G_2$.

The chopper circuit 2 includes a first switch unit 21, a second switch unit 22, a third switch unit 23, a fourth switch unit 24, a semiconductor power converter 25, and an inductor 26. The chopper circuit 2 further includes a semiconductor power converter control unit 27 and a switch control unit 28 as its control system.

The first switch unit 21, the second switch unit 22, the third switch unit 23, and the fourth switch unit 24 are implemented as semiconductor valve devices capable of unidirectional current cutoff. Each of the first switch unit 21, the second switch unit 22, the third switch unit 23, and the fourth switch unit 24 is formed by a semiconductor switching element which conducts electricity in one direction in the ON state, and a feedback diode connected in antiparallel with the semiconductor switching element. Examples of the semiconductor switching element may include an IGBT, an SiC (Silicon Carbide)-MOSFET (Metal-Oxide-Semiconductor Field-Effect Transistor), a thyristor, a GTO (Gate Turn-OFF Thyristor), and a transistor, but the type of semiconductor switching element itself does not limit the present invention, and other types of semiconductor elements may also be used.

A snubber circuit for suppressing overvoltages may be connected in parallel with the semiconductor valve device of each of the first switch unit 21, the second switch unit 22, the third switch unit 23, and the fourth switch unit 24.

The first switch unit 21, the second switch unit 22, the third switch unit 23, and the fourth switch unit 24 are connected in series with each other to conduct electricity in the same direction in the ON state. The connection point between the first switch unit 21 and the second switch unit 22 is represented by $P_3$, the connection point between the second switch unit 22 and the third switch unit 23 is represented by $P_4$, and the connection point between the third switch unit 23 and the fourth switch unit 24 is represented by $P_5$. The connection point on the side of the fourth switch unit 24 opposite to that of the fourth switch unit 24 on which the third switch unit 23 is connected to the fourth switch unit 24 is represented by $P_6$.

A terminal on the side opposite to the connection point $P_3$ between the first switch unit 21 and the second switch unit 22 is used as a positive electrode terminal $T_1$ of the first external connection terminals. A terminal on the side opposite to the connection point $P_5$ between the third switch unit 23 and the fourth switch unit 24 is used as a ground terminal $G_1$ of the first external connection terminals. The positive electrode terminal $T_1$ and the ground terminal $G_1$ form a pair of first external connection terminals.

A positive electrode terminal $T_2$ of the second external connection terminals is provided on wiring extending from the connection point $P_4$ between the second switch unit 22 and the third switch unit 23. A ground terminal $G_2$ of the second external connection terminals is provided on wiring extending from the connection point $P_6$ on the side of the fourth switch unit 24 opposite to that of the fourth switch unit 24 on which the third switch unit 23 is connected to the fourth switch unit 24. The positive electrode terminal $T_2$ and the ground terminal $G_2$ form a pair of second external connection terminals.

The forward voltage (i.e., the potential difference between the positive electrode terminal $T_1$ of the first external connection terminals and the connection point $P_3$) of the first switch unit 21 is represented by $v_{S1u}$. The forward voltage (i.e., the potential difference between the connection points $P_3$ and $P_4$) of the second switch unit 22 is represented by $v_{S2u}$. The forward voltage (i.e., the potential difference between the connection points $P_4$ and $P_5$) of the third switch unit 23 is represented by $v_{S3u}$. The forward voltage (i.e., the potential difference between the connection points $P_5$ and $P_6$) of the fourth switch unit 24 is represented by $v_{S4u}$.

The current flowing between the positive electrode terminal $T_1$ of the first external connection terminals and the connection point $P_3$ is represented by $i_{u1}$, and the current flowing between the connection point $P_4$ and the positive electrode terminal $T_2$ of the second external connection terminals is represented by $i_{u2}$.

In this specification, a set of power converters formed by the first switch unit 21, the second switch unit 22, the third switch unit 23, and the fourth switch unit 24 will be referred to as a main power converter 20 hereinafter. While one of a set of the first switch unit 21 and the third switch unit 23 and a set of the second switch unit 22 and the fourth switch unit 24 is controlled to be ON, the other set of switch units is controlled to be OFF, as will be described later.

The inductor 26 and a variable controlled voltage source which uses the semiconductor power converter 25 are provided on wiring connecting the connection point $P_3$ between the first switch unit 21 and the second switch unit 22 to the connection point $P_5$ between the third switch unit 23 and the fourth switch unit 24.

The semiconductor power converter 25 is provided as one semiconductor power converter 25 alone or a plurality of semiconductor power converters 25 cascaded to each other, on the wiring connecting the connection point $P_3$ to the connection point $P_5$. In this specification, one or more semiconductor power converters 25 will be referred to as an auxiliary power converter 29 hereinafter. In this specification, furthermore, when only one semiconductor power converter 25 is provided, the side on which the inductor 26 (to be described later) is connected to it will be referred to as a "first DC side" hereinafter, and when a plurality of semiconductor power converters 25 are cascaded to each other, the side on which another semiconductor power converter 25 different from the semiconductor power converter 25 connected to the inductor 26 is connected to the latter semiconductor power converter 25 will also be referred to as a "first DC side" hereinafter. The DC side opposite to the "first DC side" will be referred to as a "second DC side" hereinafter. As one example, FIG. 18 exemplifies the case where a plurality of (N: an integer of 2 or more) semiconductor power converters 25 are cascaded to each other on the first DC side. The number of cascades of the semiconductor power converters 25 is represented by j (where j is a natural number of 1 to N) hereinafter. High voltage resistance design of the chopper circuit 2 can easily be achieved simply by adjusting, as appropriate, the number of semiconductor power converters 25 to be cascaded to each other.

The semiconductor power converter 25 is implemented as a bidirectional chopper cell including a DC/DC converter 131 and a capacitor 132, as illustrated in FIG. 2. In other words, the semiconductor power converter 25 is implemented as a chopper cell formed by two series-connected semiconductor switches and a DC capacitor connected in parallel with the two semiconductor switches, and having, as an output terminal, each terminal of one semiconductor switch of the two semiconductor switches. The DC/DC converter 131 and the capacitor 132 are the same as those described with reference to FIG. 2. In operating the chopper circuit 2, the DC/DC converter 131 is operated to initially charge the capacitor 132. The voltage of the DC capacitor of each semiconductor power converter 25 is defined as $v_{Cju}$, and the voltage on the first DC side of the auxiliary power converter 29 is defined as $v_u$. Although details will be described later, the inductor 26 and the auxiliary power converter 29 operate as a controlled current source by controlling an inductor current $i_u$ using the auxiliary power converter 29. Referring to FIG. 18, an auxiliary power converter is implemented by cascading the semiconductor power converters 25 (chopper cells) to each other, but any arbitrary semiconductor power converter having the same functions can also be substituted for the auxiliary power converter.

The inductor 26 is connected in series with the semiconductor power converter 25 on the wiring connecting the connection point $P_3$ between the first switch unit 21 and the second switch unit 22 to the connection point $P_5$ between the third switch unit 23 and the fourth switch unit 24. An inductor current flowing through the inductor 26 is defined as $i_u$.

The semiconductor power converter 25 and the inductor 26 are, therefore, provided on the same wiring branching from the connection point $P_3$ located on wiring connecting the first switch unit 21 to the second switch unit 22 in the main power converter 20. In the example illustrated in FIG. 18, the inductor 26 is interposed between the connection point $P_3$ and the semiconductor power converter 25, and the second external connection terminals $T_2$ and $G_2$ are placed at the connection point $P_6$ (i.e., on the side of the set of the semiconductor power converters 25 opposite to that of the set of the semiconductor power converters 25 on which the inductor 26 is connected to the semiconductor power converter 25) on the side of the auxiliary power converter 29 opposite to that of the auxiliary power converter 29 on which the inductor 26 is connected to the auxiliary power converter 29, but the order of placement of the semiconductor power converter 25 and the inductor 26 can be freely designed, as illustrated in FIG. 3, on the wiring provided with the semiconductor power converters 25 between the connection points $P_3$ and $P_5$, as in the above-described first embodiment.

The semiconductor power converter control unit 27 controls the power conversion operation of the semiconductor power converter 25 to output a current containing a DC component and an AC component having a predetermined period.

The switch control unit 28 controls one of the set of the first switch unit 21 and the third switch unit 23 and the set of the second switch unit 22 and the fourth switch unit 24 to be ON and controls the other set of switch units to be OFF. The switch control unit 28 performs switching from ON to OFF and switching from OFF to ON for each of the set of the first switch unit 21 and the third switch unit 23 and the set of the second switch unit 22 and the fourth switch unit 24 when the value of the current output from the semiconductor power converter 25 is controlled to be equal to or smaller than a predetermined value by the semiconductor power converter control unit 27. The predetermined value means herein a value sufficiently smaller than the rated current of the semiconductor power converter 25. As one example, the predetermined value is set to a value of, e.g., about 0% to 10% of the rated current of the semiconductor power converter 25, but it may be set to a value larger than 10% of the rated current of the semiconductor power converter 25, depending on the environment under which the chopper circuit 2 is applied.

The semiconductor power converter control unit 27 and the switch control unit 28 may be constructed in. e.g., software program form, or may be constructed as a combination of various electronic circuits and a software program. When, for example, these units are constructed in software program form, the function of each of the above-mentioned units can be implemented by causing an arithmetic processing unit to operate in accordance with the software program. Alternatively, the semiconductor power converter control unit 27 and the switch control unit 28 may be implemented as a semiconductor integrated circuit in which a software program for implementing the function of each of these units is written.

The operation principle of the chopper circuit 2 according to the second embodiment of the present disclosure will be described subsequently. The operation principles of the semiconductor power converter control unit 27 and the switch control unit 28 are similar to those of the semiconductor power converter control unit 15 and the switch control unit 16 in the first embodiment.

The chopper circuit 2 according to the second embodiment can bidirectionally convert a voltage between the first DC voltage $v_{dc1}$ across the pair of first external connection terminals $T_1$ and $G_1$ and the second DC voltage $v_{dc2}$ across the pair of second external connection terminals $T_2$ and $G_2$. However, the chopper circuit 2 according to the second embodiment may preferably have a relationship "$v_{dc1} > v_{dc2}$" in which the first DC voltage $v_{dc1}$ is higher than the second DC voltage $v_{dc2}$.

Figure 19:
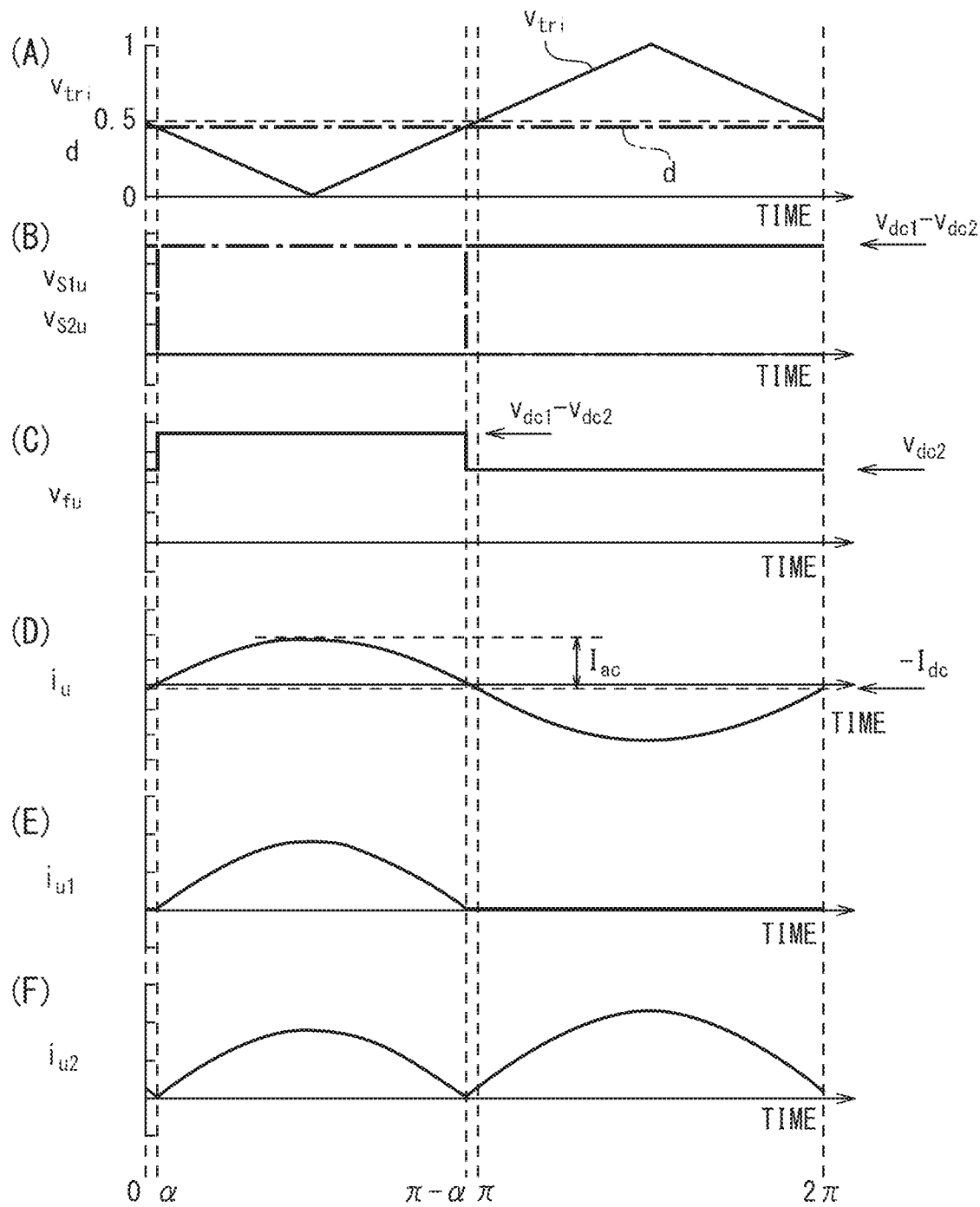
FIG. 19 illustrates graphs of ideal waveforms in respective portions of the chopper circuit according to the second embodiment of the present disclosure, and depicts in (A), the relationship between a triangular wave and a modulation wave used in a switch control unit; in (B), voltages respectively appearing across the two ends of a first switch unit and the two ends of a second switch unit; in (C), a voltage output from an auxiliary power converter; in (D), an inductor current; in (E), a current flowing through the first switch unit; and in (F), a current flowing through the second switch unit.

FIG. 19 illustrates graphs of ideal waveforms in respective portions of the chopper circuit according to the second embodiment of the present disclosure, and depicts in (A), the relationship between a triangular wave and a modulation wave used in a switch control unit; in (B), voltages respectively appearing across the two ends of a first switch unit and the two ends of a second switch unit; in (C), a voltage output from an auxiliary power converter; in (D), an inductor current; in (E), a current flowing through the first switch unit; and in (F), a current flowing through the second switch unit. Referring to FIG. 19(A), a triangular wave $v_{tri}$ is indicated by a solid line, and a modulation wave d is indicated by an alternate long and short dashed line.

The operation of the chopper circuit 2 according to the second embodiment differs between the case where the second DC voltage $v_{dc2}$ is lower than ½ of the first DC voltage $v_{dc1}$ ($v_{dc2} < 0.5 v_{dc1}$) and the case where the second DC voltage $v_{dc2}$ is higher than ½ of the first DC voltage $v_{dc1}$ ($v_{dc2} > 0.5 v_{dc1}$), but the same operation principle is applicable to both cases. The case where the second DC voltage $v_{dc2}$ is lower than ½ of the first DC voltage $v_{dc1}$ ($v_{dc2} < 0.5 v_{dc1}$) will be described hereinafter.

ON and OFF of the first switch unit 21 and the second switch unit 22 are determined by the switch control unit 28, based on the result of comparison between the modulation wave d and the triangular wave $v_{tri}$ that takes a minimum value of 0 and a maximum value of 1. Although the details of a method for determining the modulation wave d will be described later, the modulation wave d is determined by the relationship between the first DC voltage $v_{dc1}$ and the second DC voltage $v_{dc2}$. The switch control unit 28 controls one of the set of the first switch unit 21 and the third switch unit 23 and the set of the second switch unit 22 and the fourth switch unit 24 to be ON and controls the other set of switch units to be OFF. For example, when, as illustrated in FIG. 19(A), the triangular wave $v_{tri}$ is smaller than the modulation wave d, the switch control unit 28 controls the set of the first switch unit 21 and the third switch unit 23 to be ON and controls the set of the second switch unit 22 and the fourth switch unit 24 to be OFF. In this case, the voltage appearing across the two ends of the first switch unit 21 is $v_{S1u}=0$, and the voltage appearing across the two ends of the second switch unit 22 is $v_{S2u}=v_{dc1}-v_{dc2}$, as illustrated in FIG. 19(B). As another example, when, as illustrated in FIG. 19(A), the triangular wave $v_{tri}$ is larger than the modulation wave d, the switch control unit 28 controls the set of the first switch unit 21 and the third switch unit 23 to be OFF and controls the set of the second switch unit 22 and the fourth switch unit 24 to be ON. In this case, the voltage appearing across the two ends of the first switch unit 21 is $v_{S1u}=v_{dc1}-v_{dc2}$, and the voltage appearing across the two ends of the second switch unit 22 is $v_{S2u}=0$, as illustrated in FIG. 19(B).

The waveforms in the respective portions of the chopper circuit 2 according to the second embodiment are basically the same as those in the respective portions of the chopper circuit 1 according to the first embodiment, except for the current $i_{u1}$ flowing between the positive electrode terminal $T_1$ of the first external connection terminals and the connection point $P_3$, and the current $i_{u2}$ flowing between the connection point $P_4$ and the positive electrode terminal $T_2$ of the second external connection terminals. In the chopper circuit 1 according to the first embodiment, when the first switch unit 11 is ON, the current flowing through the first switch unit 1 is $i_{u1}=i_u$, and the current flowing through the second switch unit 12 is $i_{u2}=0$, and when the second switch unit 12 is ON, the current flowing through the first switch unit 11 is $i_{u1}=0$, and the current flowing through the second switch unit 12 is $i_{u2}=-i_u$. In contrast to this, in the chopper circuit 2 according to the second embodiment, when the set of the first switch unit 21 and the third switch unit 23 is ON, both the current $i_{u1}$ flowing between the positive electrode terminal $T_1$ of the first external connection terminals and the connection point $P_3$, and the current $i_{u2}$ flowing between the connection point $P_4$ and the positive electrode terminal $T_2$ of the second external connection terminals are $i_u$ ($i_{u1}=i_{u2}=i_u$), and when the set of the second switch unit 22 and the fourth switch unit 24 is ON, the current flowing between the positive electrode terminal $T_1$ of the first external connection terminals and the connection point $P_3$ is $i_{u1}=0$, and the current flowing between the connection point $P_4$ and the positive electrode terminal $T_2$ of the second external connection terminals is $i_{u2}=-i_u$.

A relation for the phase α of the chopper circuit 2 according to the second embodiment is derived with reference to equations (5) to (10) as the following equation:

[Math. 22]

$$\frac{V_{dc3}}{\pi}\cos\alpha - \frac{V_{dc1}}{2}\sin\alpha + \frac{V_{dc1}}{\pi}\alpha\sin\alpha = \frac{2V_{dc2}}{\pi}\cos\alpha + \frac{2V_{dc2}}{\pi}\alpha\sin\alpha \quad (22)$$

To simplify equation (22), when approximations "sin α≈α" and "cos α≈1−α²/2" are applied, equation (22) can be rewritten as the following equation:

[Math. 23]

$$\alpha^2 - \pi\frac{V_{dc1}}{V_{dc1}-2V_{dc2}}\alpha + 2 = 0 \quad (23)$$

Equation (23) represents a quadratic equation for the phase α, and solving equation (23) for the phase α yields the following equation:

[Math. 24]

$$\alpha = \frac{\pi}{2}\frac{V_{dc1}}{V_{dc1}-2V_{dc2}} \pm \frac{1}{2}\sqrt{\pi^2\left(\frac{V_{dc1}}{V_{dc1}-2V_{dc2}}\right)^2 - 8} \quad (24)$$

From the phase-related condition "0<α<π/2," the phase α can be expressed as the following equation:

[Math. 25]

$$\alpha = \frac{\pi}{2}\frac{V_{dc1}}{V_{dc1}-2V_{dc2}} - \frac{1}{2}\sqrt{\pi^2\left(\frac{V_{dc1}}{V_{dc1}-2V_{dc2}}\right)^2 - 8} \quad (25)$$

Referring to FIG. 19(A), the slope of the triangular wave $v_{tri}$ in the interval from a phase of π/2 to a phase of 3π/2 is "1/π," and the value of the triangular wave $v_{tri}$ at a phase of π is "0.5." The value of the triangular wave $v_{tri}$ at a phase of π−α is "d." From these relationships, d can be expressed as the following equation:

[Math. 26]

$$d = 0.5 - \frac{\alpha}{\pi} \quad (26)$$

As described above, the modulation wave d is determined based on equation (26), and the phase α is determined based on equation (25). When the triangular wave $v_{tri}$ is smaller than the modulation wave d determined based on equation (26), the switch control unit 28 controls the set of the first switch unit 21 and the third switch unit 23 to be ON and controls the set of the second switch unit 22 and the fourth switch unit 24 to be OFF. When the triangular wave $v_{tri}$ is larger than the modulation wave d determined based on equation (26), the switch control unit 28 controls the set of the first switch unit 21 and the third switch unit 23 to be OFF and controls the set of the second switch unit 22 and the fourth switch unit 24 to be ON. The switch control unit 28 performs switching from ON to OFF and switching from OFF to ON for each of the set of the first switch unit 21 and the third switch unit 23 and the set of the second switch unit 22 and the fourth switch unit 24, at the phases α and π−α in which the current output from the semiconductor power converter 25 is controlled to be zero by the semiconductor power converter control unit 27.

The above-mentioned method for determining the phase α assumes an ideal state in which each converter has zero loss. In the ideal state, when the phase of the current output from the semiconductor power converter 25 by the semiconductor power converter control unit 27 is α and π−α, this current output from the semiconductor power converter 25 is zero. In an actual chopper circuit 2, however, since each converter in the chopper circuit 2 has any loss, even when the phase of the current output from the semiconductor power converter 25 by the semiconductor power converter control unit 27 is α and π−α, this current output from the semiconductor power converter 25 is not zero, and a minute current flows. In view of this, the switch control unit 28 performs switching from ON to OFF and switching from OFF to ON for each of the set of the first switch unit 21 and the third switch unit 23 and the set of the second switch unit 22 and the fourth switch unit 24, at the phases α and π−α in which the current output from the semiconductor power converter 25 is controlled to be equal to or lower than a predetermined value by the semiconductor power converter control unit 27. The predetermined value means herein a value sufficiently smaller than the rated current of the semiconductor power converter 25. As one example, the predetermined value is set to a value of, e.g., about 0% to 10% of the rated current of the semiconductor power converter 25, but it may be set to a value larger than 10% of the rated current of the semiconductor power converter 25, depending on the environment under which the chopper circuit 2 is applied.

A simulation result for a chopper circuit system 1000 including three chopper circuits 2 (Number of Units M=3) will be described subsequently.

Figure 20:
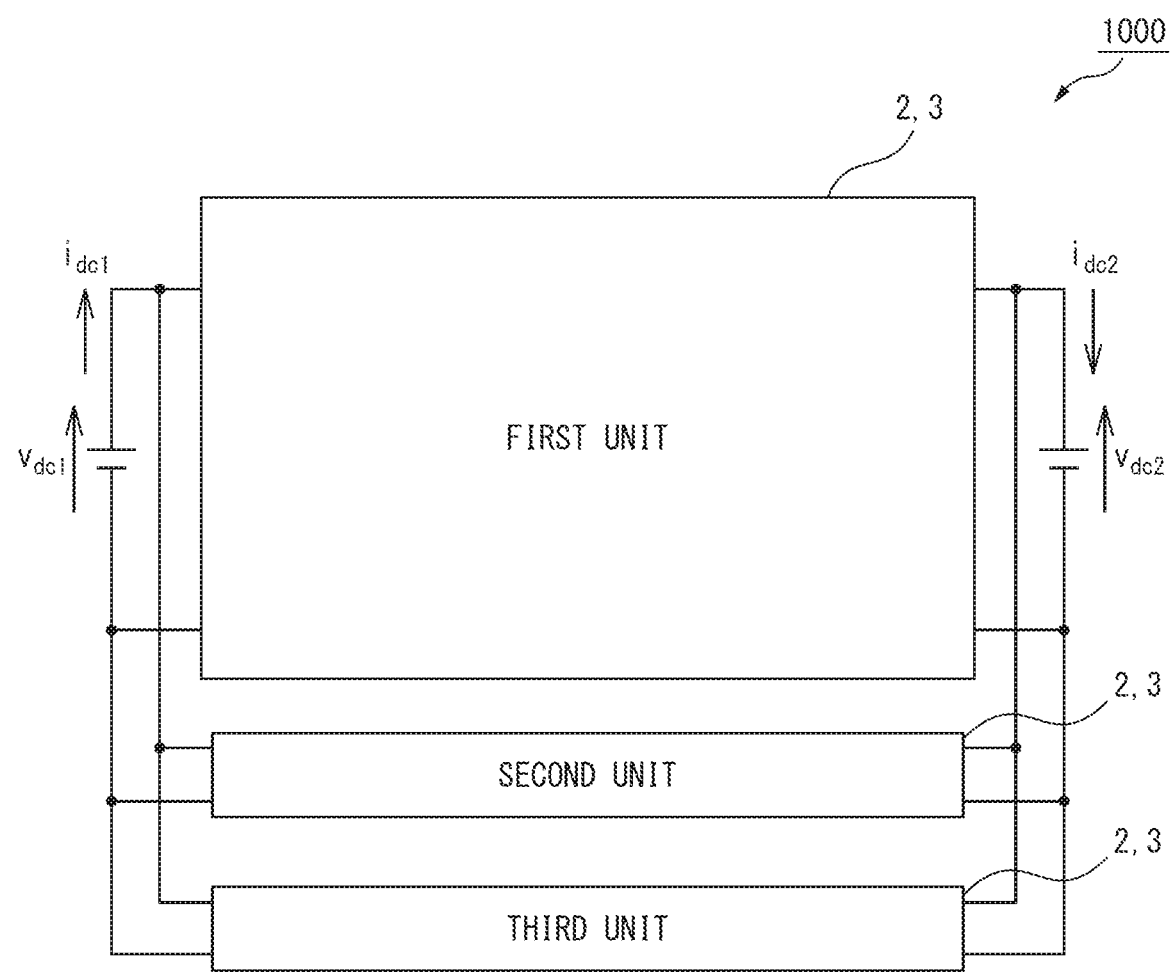
FIG. 20 is a circuit diagram illustrating a chopper circuit system formed by parallel-connected chopper circuits according to the second embodiment or a third embodiment of the present disclosure.

FIG. 20 is a circuit diagram illustrating a chopper circuit system formed by parallel-connected chopper circuits according to the second embodiment or a third embodiment of the present disclosure. As illustrated in FIG. 20, the chopper circuit system 1000 is formed by chopper circuits 2 connected in parallel with each other. The number of chopper circuits 2 is represented by the number of units M (where M is a natural number), and the respective chopper circuits 2 are represented as a first unit, a second unit, . . . , an Mth unit. Each unit (chopper circuit 2) is connected in parallel with a common DC power supply $v_{dc1}$ on the high-voltage side, and connected in parallel with a common DC power supply $v_{dc2}$ on the low-voltage side. The triangular wave initial phase of the main power converter 20 in each unit is shifted by 180/M degrees for each unit. The phase of each inductor current in is similarly shifted by 180/M degrees.

FIG. 21 is a table illustrating circuit constants used for simulation of a chopper circuit system formed by three parallel-connected chopper circuits according to the second embodiment of the present disclosure, in which the simulation used "PSCAD/EMTDC." The number of units M of the chopper circuit system 1000 was three, and the number (the number of chopper cells) N of semiconductor power converters 25 provided in the chopper circuit 2 serving as each unit was set to three. The first DC voltage $v_{dc1}$ was set to 1.5 [kV], the second DC voltage $v_{dc2}$ was set to 0.6 [kV], and the DC capacitor voltage $V_C$ of the capacitor in each semiconductor power converter 25 (chopper cell) was set to 0.45 [kV]. The carrier frequency $f_{SM}$ of the main power converter 20 in each unit was set to 450 [Hz], and the carrier frequency $f_{SA}$ of the auxiliary power converter 29 was set to 10 [kHz]. Since phase shift PWM is applied to each chopper cell, the equivalent carrier frequency of the auxiliary power converter 29 is 30 [kHz] (=$Nf_{SA}$). This simulation aims to confirm the principle, and therefore assumes an ideal state. In other words, assuming an analog control system having zero control delay, ideal switches having zero dead time were used.

Figure 22:
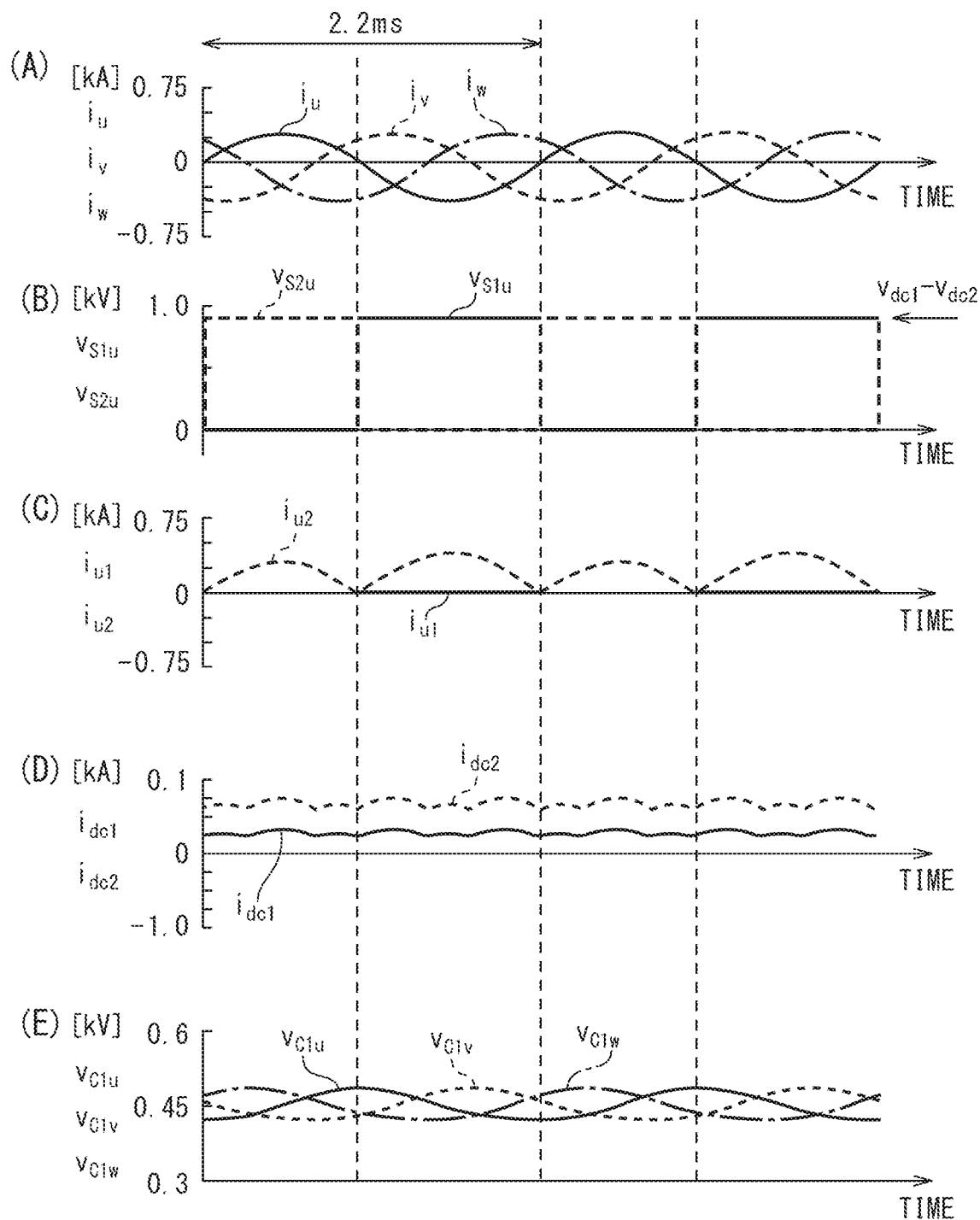
FIG. 22 illustrates graphs of simulated waveforms when a power of 400 [kW] is transmitted from a first DC voltage side to a second DC voltage side in the chopper circuit system formed by the three parallel-connected chopper circuits according to the second embodiment of the present disclosure, and depicts in (A), inductor currents for respective units; in (B), voltages respectively appearing across the two ends of a first switch unit and the two ends of a second switch unit in a first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for capacitors in semiconductor power converters (chopper cells).

FIG. 22 illustrates graphs of simulated waveforms when a power of 400 [kW] is transmitted from a first DC voltage side to a second DC voltage side in the chopper circuit system formed by the three parallel-connected chopper circuits according to the second embodiment of the present disclosure, and depicts in (A), inductor currents for respective units; in (B), voltages respectively appearing across the two ends of a first switch unit and the two ends of a second switch unit in a first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for capacitors in semiconductor power converters (chopper cells).

With attention being focused on the inductor currents $i_u$, $i_v$, and $i_w$ illustrated in FIG. 22(A), a negative DC current is obviously superimposed on an AC component having a frequency of 450 [Hz]. The AC component having a frequency of 450 [Hz] has a sinusoidal waveform, and contains little harmonic current. With attention being focused on the voltages (semiconductor valve device forward voltages) $v_{S1u}$ and $v_{S2u}$ respectively appearing across the two ends of the first switch unit 21 and the two ends of the second switch unit 22 in the first unit illustrated in FIG. 22(B), when $v_{S1u}$=$v_{S3u}$=0, i.e., when the set of the first switch unit 21 and the third switch unit 23 is ON, both the current $i_{u1}$ flowing through the first switch unit 21 and the current $i_{u2}$ flowing through the second switch unit 22 are $i_u$ ($i_{u1}$=$i_{u2}$=$i_u$), as illustrated in FIG. 22(C), and when "$v_{S1u}$=$v_{dc1}$−$v_{dc2}$=900 [V]," i.e., when the set of the second switch unit 22 and the fourth switch unit 24 is ON, the current flowing through the first switch unit 21 is $i_{u1}$=0 and the current flowing through the second switch unit 22 is $i_{u2}$=−$i_u$, as illustrated in FIG. 22(C). This simulation result reveals that giving the modulation factor d presented in equation (26) makes it possible to implement soft switching operations (i.e., switching operations at the timings at which the flowing currents are kept equal to or lower than a very small predetermined value (e.g., zero)) for both the turn-off times and the turn-on times in the first switch unit 21, the second switch unit 22, the third switch unit 23, and the fourth switch unit 24. Hence, no switching losses occur in the first switch unit 21, the second switch unit 22, the third switch unit 23, and the fourth switch unit 24.

With attention being focused on the current $i_{dc1}$ flowing on the side of the first DC voltage $v_{dc1}$ and the current $i_{dc2}$ flowing on the side of the second DC voltage $v_{dc2}$ in the chopper circuit system 1000 illustrated in FIG. 22(D), summation of the individual currents of the chopper circuit 2 of the first unit, the chopper circuit 2 of the second unit, and the chopper circuit 2 of the third unit obviously brings the currents $i_{dc1}$ and $i_{dc2}$ closer to DC currents, compared to the DC current of only one chopper circuit 2 used alone. Obviously as well, a stepwise change in current occurring in the conventional chopper circuit does not occur in the chopper circuit system 1000. Therefore, no overvoltages resulting from the stepwise current occur in the chopper circuit system 1000.

Again, obviously, each of the DC capacitor voltages $v_{C1u}$, $v_{C1v}$, and $v_{C1w}$ of the capacitors in the semiconductor power converters 25 (chopper cells) illustrated in FIG. 22(E) contains DC and AC components, and the DC component of these components satisfactorily follows 450 [V] that is the command value. Again, obviously, as for the AC component, an AC component having a frequency of 450 [Hz] is present, but its magnitude is sufficiently lower than that of the DC component.

Figure 23:
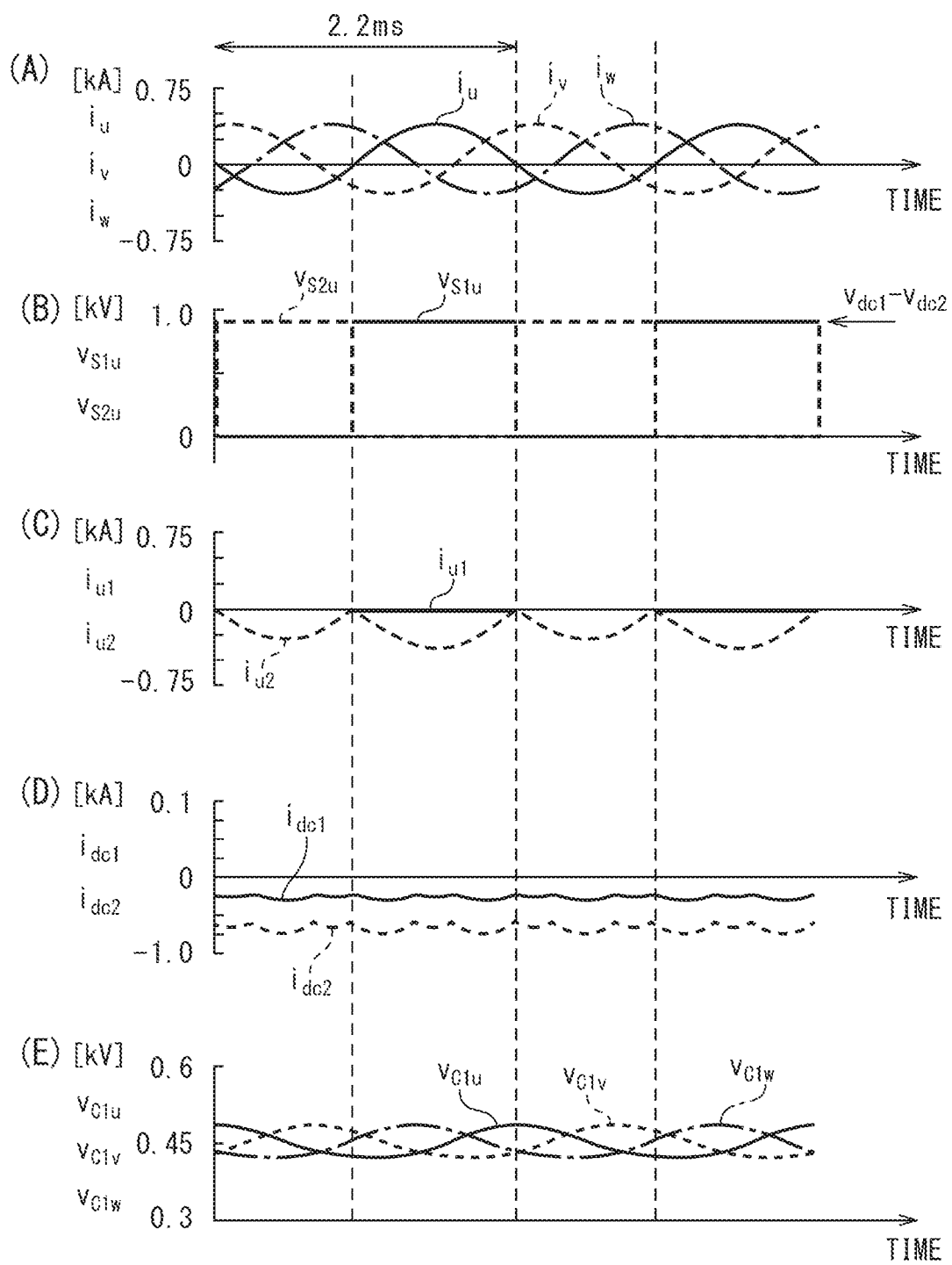
FIG. 23 illustrates graphs of simulated waveforms when a power of 400 [kW] is transmitted from the second DC voltage side to the first DC voltage side in the chopper circuit system formed by the three parallel-connected chopper circuits according to the second embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

FIG. 23 illustrates graphs of simulated waveforms when a power of 400 [kW] is transmitted from the second DC voltage side to the first DC voltage side in the chopper circuit system formed by the three parallel-connected chopper circuits according to the second embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells). In other words, FIG. 23 illustrates a simulation result obtained when power is transmitted in the direction (from the second DC voltage side to the first DC voltage side) opposite to that in the above-mentioned simulation of FIG. 22.

With attention being focused on the inductor currents $i_u$, $i_v$, and $i_w$ illustrated in FIG. 23(A), a positive DC current is obviously superimposed on an AC component having a frequency of 450 [Hz]. Obviously as well, even when the direction of power transmission changes from that in FIG. 22, the phase α presented in equation (25) does not change. In other words, again, obviously, soft switching operations (i.e., switching operations at the timings at which the flowing currents are kept equal to or lower than a very small predetermined value (e.g., zero)) can be implemented for both the turn-off times and the turn-on times in the first switch unit 21, the second switch unit 22, the third switch unit 23, and the fourth switch unit 24. Other simulated waveforms are the same as those illustrated in FIG. 22.

Figure 24:
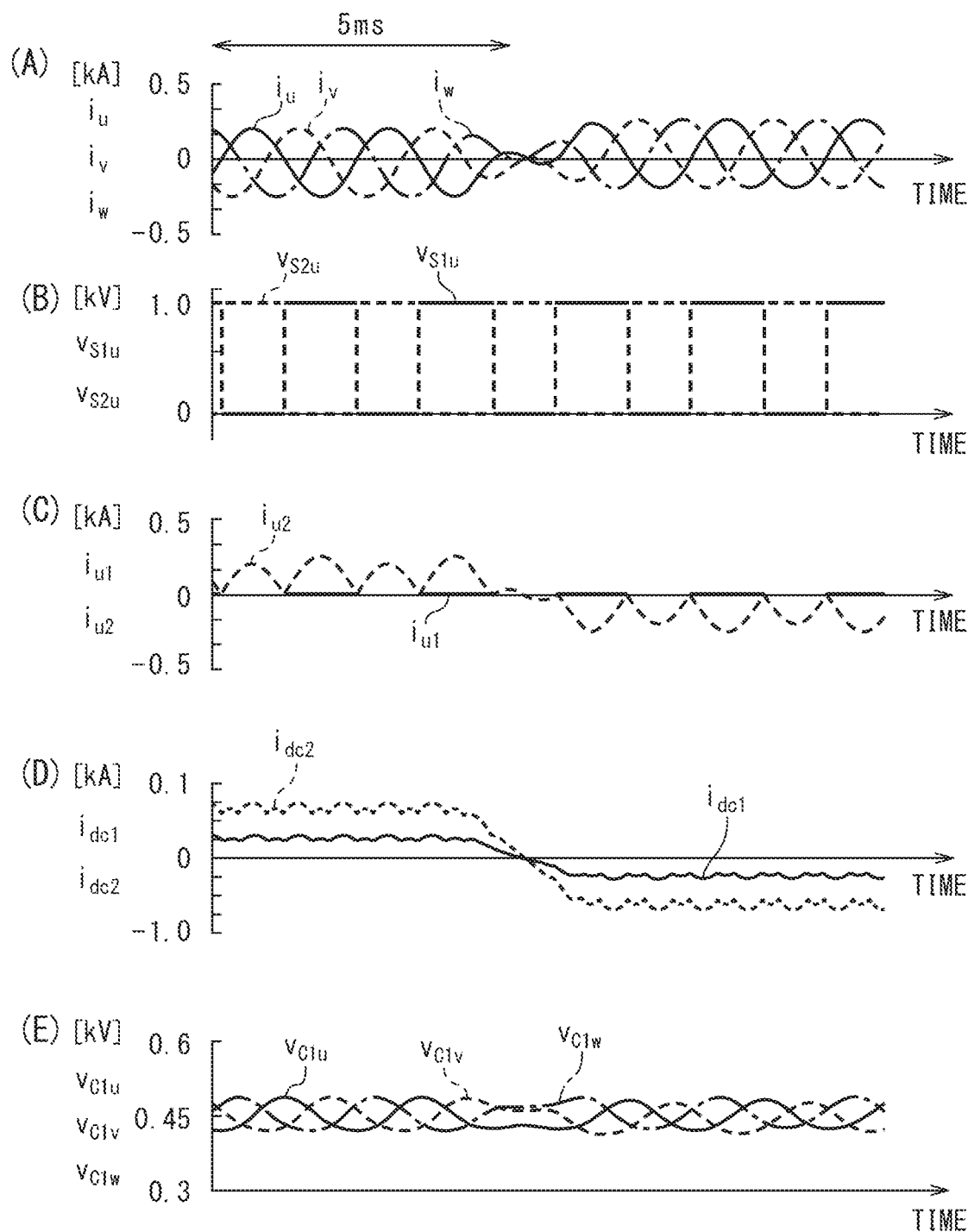
FIG. 24 illustrates graphs of simulated waveforms when the direction to transmit a power of 400 [kW] is reversed between the first DC voltage side and the second DC voltage side at a time instant of 5 ms in the chopper circuit system formed by the three parallel-connected chopper circuits according to the second embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

FIG. 24 illustrates graphs of simulated waveforms when the direction to transmit a power of 400 [kW] is reversed between the first DC voltage side and the second DC voltage side at a time instant of 5 ms in the chopper circuit system formed by the three parallel-connected chopper circuits according to the second embodiment of the present disclosure, and depicts in (A), inductor currents for the respective units; in (B), voltages respectively appearing across the two ends of the first switch unit and the two ends of the second switch unit in the first unit; in (C), currents respectively flowing through the first switch unit and the second switch unit in the first unit; in (D), currents respectively flowing on the first DC voltage side and the second DC voltage side in the chopper circuit system; and in (E), DC capacitor voltages for the capacitors in the semiconductor power converters (chopper cells).

As illustrated in FIG. 24, obviously, even when the direction of power transmission is rapidly changed at a time instant of 5 ms, the chopper circuit system 1000 satisfactorily operates without causing overvoltages and overcurrents. This reveals that the auxiliary power converter 29 has a high-speed current control function.

The chopper circuit according to the second embodiment of the present disclosure has been described above. A chopper circuit according to a third embodiment of the present disclosure will be described subsequently.

Figure 25:
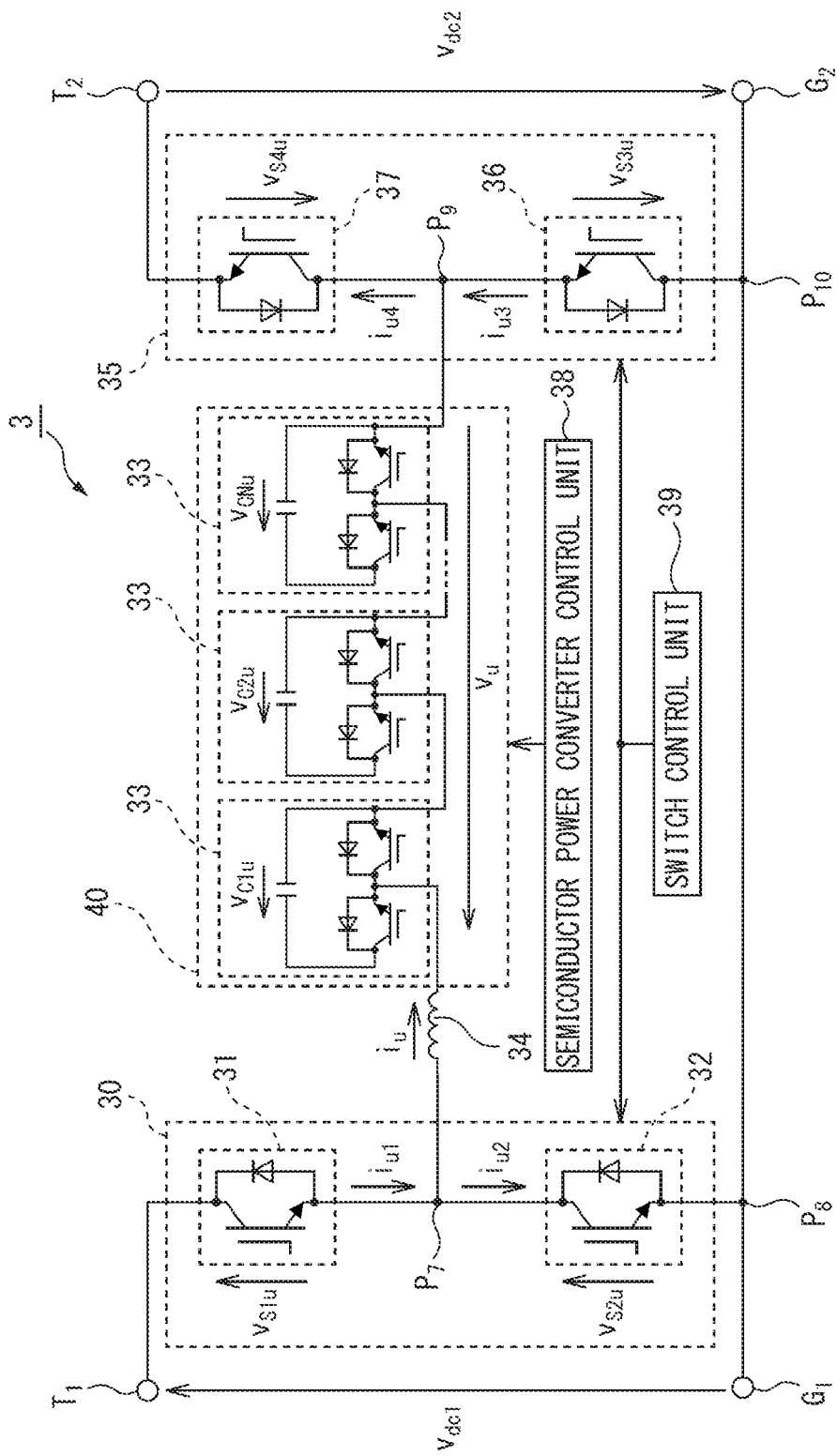
FIG. 25 is a circuit diagram illustrating a chopper circuit according to a third embodiment of the present disclosure.

FIG. 25 is a circuit diagram illustrating a chopper circuit according to a third embodiment of the present disclosure.

A chopper circuit 3 according to the third embodiment of the present disclosure bidirectionally converts a voltage between a first DC voltage $v_{dc1}$ across a pair of first external connection terminals $T_1$ and $G_1$ and a second DC voltage $v_{dc2}$ across a pair of second external connection terminals $T_2$ and $G_2$. A DC power supply is connected to one of a set of the first external connection terminals $T_1$ and $G_1$ and a set of the second external connection terminals $T_2$ and $G_2$, and a load or another DC power supply is connected to the other set of external connection terminals.

When, for example, a DC power supply is connected to the first external connection terminals $T_1$ and $G_1$, and a load is connected to the second external connection terminals $T_2$ and $G_2$, the chopper circuit 3 operates as a step-down chopper or a step-up chopper. In this case, a voltage output from the DC power supply is used as the first DC voltage $v_{dc1}$, and a voltage applied to the load is used as the second DC voltage $v_{dc2}$.

When, as another example, a load is connected to the first external connection terminals $T_1$ and $G_1$, and a DC power supply is connected to the second external connection terminals $T_2$ and $G_2$, the chopper circuit 3 operates as a step-down chopper or a step-up chopper. In this case, a voltage applied to the load is used as the first DC voltage $v_{dc1}$, and a voltage output from the DC power supply is used as the second DC voltage $v_{dc2}$.

As still another example, a DC power supply may be connected to the first external connection terminals $T_1$ and $G_1$, and another DC power supply may be connected to the second external connection terminals $T_2$ and $G_2$.

The chopper circuit 3 includes a first main power converter 30 including a first switch unit 31 and a second switch unit 32, a semiconductor power converter 33, an inductor 34, and a second main power converter 35 including a third switch unit 36 and a fourth switch unit 37. The chopper circuit 3 further includes a semiconductor power converter control unit 38 and a switch control unit 39 as its control system.

The first switch unit 31, the second switch unit 32, the third switch unit 36, and the fourth switch unit 37 are implemented as semiconductor valve devices capable of unidirectional current cutoff. Each of the first switch unit 31, the second switch unit 32, the third switch unit 36, and the fourth switch unit 37 is formed by a semiconductor switching element which conducts electricity in one direction in the ON state, and a feedback diode connected in antiparallel with the semiconductor switching element. Examples of the semiconductor switching element may include an IGBT, an SiC (Silicon Carbide)-MOSFET (Metal-Oxide-Semiconductor Field-Effect Transistor), a thyristor, a GTO (Gate Turn-OFF Thyristor), and a transistor, but the type of semiconductor switching element itself does not limit the present invention, and other types of semiconductor elements may also be used.

A snubber circuit for suppressing overvoltages may be connected in parallel with the semiconductor valve device of each of the first switch unit 31, the second switch unit 32, the third switch unit 36, and the fourth switch unit 37.

The first switch unit 31 and the second switch unit 32 constituting the first main power converter 30 are connected in series with each other to conduct electricity in the same direction in the ON state. The connection point between the first switch unit 31 and the second switch unit 32 is represented by $P_7$. The connection point on the side of the second switch unit 32 opposite to that of the second switch unit 32 on which the first switch unit 31 is connected to the second switch unit 32 is represented by $P_8$.

The third switch unit 36 and the fourth switch unit 37 constituting the second main power converter 35 are connected in series with each other to conduct electricity in the same direction in the ON state. The connection point between the third switch unit 36 and the fourth switch unit 37 is represented by $P_9$. The connection point on the side of the third switch unit 36 opposite to that of the third switch unit 36 on which the fourth switch unit 37 is connected to the third switch unit 36 is represented by $P_{10}$.

A terminal on the opposite side of the first switch unit 31 with respect to the connection point $P_7$ between the first switch unit 31 and the second switch unit 32 is used as a positive electrode terminal $T_1$ of the first external connection terminals. A terminal on the opposite side of the second switch unit 32 with respect to the connection point $P_7$ between the first switch unit 31 and the second switch unit 32 is used as a ground terminal $G_1$ of the first external connection terminals. The positive electrode terminal $T_1$ and the ground terminal $G_1$ form a pair of first external connection terminals. In other words, the two electrode terminals on the side opposite to the connection point $P_7$ between the first switch unit 31 and the second switch unit 32 are used as a pair of first external connection terminals.

A terminal on the opposite side of the fourth switch unit 37 with respect to the connection point $P_9$ between the third switch unit 36 and the fourth switch unit 37 is used as a negative electrode terminal $T_2$ of the second external connection terminals. A terminal on the opposite side of the third switch unit 36 with respect to the connection point $P_9$ between the third switch unit 36 and the fourth switch unit 37 is used as a ground terminal $G_2$ of the second external connection terminals. The negative electrode terminal $T_2$ and the ground terminal $G_2$ form a pair of second external connection terminals. In other words, the two electrode terminals on the side opposite to the connection point $P_9$ between the third switch unit 36 and the fourth switch unit 37 are used as a pair of second external connection terminals.

The ground terminal $G_1$ of the first external connection terminals, the connection points $P_8$ and $P_{10}$, and the ground terminal $G_2$ of the second external connection terminals are provided on the same wiring.

The forward voltage (i.e., the potential difference between the positive electrode terminal $T_1$ of the first external connection terminals and the connection point $P_7$) of the first switch unit 31 is represented by $v_{S1u}$. The forward voltage (i.e., the potential difference between the connection points $P_7$ and $P_8$) of the second switch unit 32 is represented by $v_{S2u}$. The forward voltage (i.e., the potential difference between the connection points $P_9$ and $P_{10}$) of the third switch unit 36 is represented by $v_{S3u}$. The forward voltage (i.e., the potential difference between the negative electrode terminal $T_2$ of the second external connection terminals and the connection point $P_9$ of the fourth switch unit 37 is represented by $v_{S4u}$.

The current flowing through the first switch unit 31 is represented by $i_{u1}$, the current flowing through the second switch unit 32 is represented by $i_{u2}$, the current flowing through the third switch unit 36 is represented by $i_{u3}$, and the current flowing through the fourth switch unit 37 is represented by $i_{u4}$.

While one of a set of the first switch unit 31 and the third switch unit 36 and a set of the second switch unit 32 and the fourth switch unit 37 is controlled to be ON, the other set of switch units is controlled to be OFF.

The inductor 34 and a variable controlled voltage source which uses the semiconductor power converter 33 are provided on wiring connecting the connection point $P_7$ between the first switch unit 31 and the second switch unit 32 to the connection point $P_9$ between the third switch unit 36 and the fourth switch unit 37.

The semiconductor power converter 33 is provided as one semiconductor power converter 33 alone or a plurality of semiconductor power converters 33 cascaded to each other, on the wiring connecting the connection point $P_7$ to the connection point $P_9$. In this specification, one or more semiconductor power converters 33 will be referred to as an auxiliary power converter 40 hereinafter. In this specification, furthermore, when only one semiconductor power converter 33 is provided, the side on which the inductor 34 (to be described later) is connected to it will be referred to as a "first DC side" hereinafter, and when a plurality of semiconductor power converters 33 are cascaded to each other, the side on which another semiconductor power converter 33 different from the semiconductor power converter 33 connected to the inductor 34 is connected to the latter semiconductor power converter 33 will also be referred to as a "first DC side" hereinafter. The DC side opposite to the "first DC side" will be referred to as a "second DC side" hereinafter. As one example, FIG. 25 exemplifies the case where a plurality of (N: an integer of 2 or more) semiconductor power converters 33 are cascaded to each other on the first DC side. The number of cascades of the semiconductor power converters 33 is represented by j (where j is a natural number of 1 to N) hereinafter. High voltage resistance design of the chopper circuit 3 can easily be achieved simply by adjusting, as appropriate, the number of semiconductor power converters 33 to be cascaded to each other.

The semiconductor power converter 33 is implemented as a bidirectional chopper cell including a DC/DC convener 131 and a capacitor 132, as illustrated in FIG. 2. In other words, the semiconductor power converter 33 is implemented as a chopper cell formed by two series-connected semiconductor switches and a DC capacitor connected in parallel with the two semiconductor switches, and having, as an output terminal, each terminal of one semiconductor switch of the two semiconductor switches. The DC/DC converter 131 and the capacitor 132 are the same as those described with reference to FIG. 2. In operating the chopper circuit 3, the DC/DC converter 131 is operated to initially charge the capacitor 132. The voltage of the DC capacitor of each semiconductor power converter 33 is defined as $v_{Cju}$, and the voltage on the first DC side of the auxiliary power converter 40 is defined as $v_u$. Although details will be described later, the inductor 34 and the auxiliary power converter 40 operate as a controlled current source by controlling an inductor current $i_u$ using the auxiliary power converter 40. Referring to FIG. 25, an auxiliary power converter is implemented by cascading the semiconductor power converters 33 (chopper cells) to each other, but any arbitrary semiconductor power converter having the same functions can also be substituted for the auxiliary power converter.

The inductor 34 is connected in series with the semiconductor power converter 33 on the wiring connecting the connection point $P_7$ between the first switch unit 31 and the second switch unit 32 to the connection point $P_9$ between the third switch unit 36 and the fourth switch unit 37. A voltage applied to the two ends of the inductor 34 is defined as $v_u$. An inductor current flowing through the inductor 34 is defined as $i_u$.

The semiconductor power converter 33 and the inductor 34 are, therefore, provided on wiring branching from wiring connecting the first switch unit 31 to the second switch unit 32. In the example illustrated in FIG. 25, the inductor 34 is interposed between the connection point $P_7$ and the semiconductor power converter 33, but the order of placement of the semiconductor power converter 33 and the inductor 34 can be freely designed, as illustrated in FIG. 3, on the wiring provided with the semiconductor power converters 33 between the connection points $P_7$ and $P_9$, as in the above-described first and second embodiments.

The semiconductor power converter control unit 38 controls the power conversion operation of the semiconductor power converter 33 to output a current containing a DC component and an AC component having a predetermined period.

The switch control unit 39 controls one of the set of the first switch unit 31 and the third switch unit 36 and the set of the second switch unit 32 and the fourth switch unit 37 to be ON and controls the other set of switch units to be OFF. The switch control unit 39 performs switching from ON to OFF and switching from OFF to ON for each of the set of the first switch unit 31 and the third switch unit 36 and the set of the second switch unit 32 and the fourth switch unit 37 when the value of the current output from the semiconductor power converter 33 is controlled to be equal to or smaller than a predetermined value by the semiconductor power converter control unit 38. The predetermined value means herein a value sufficiently smaller than the rated current of the semiconductor power converter 33. As one example, the predetermined value is set to a value of, e.g., about 0% to 10% of the rated current of the semiconductor power converter 33, but it may be set to a value larger than 10% of the rated current of the semiconductor power converter 33, depending on the environment under which the chopper circuit 3 is applied.

The semiconductor power converter control unit 38 and the switch control unit 39 may be constructed in, e.g., software program form, or may be constructed as a combination of various electronic circuits and a software program. When, for example, these units are constructed in software program form, the function of each of the above-mentioned units can be implemented by causing an arithmetic processing unit to operate in accordance with the software program. Alternatively, the semiconductor power converter control unit 38 and the switch control unit 39 may be implemented as a semiconductor integrated circuit in which a software program for implementing the function of each of these units is written.

The operation principle of the chopper circuit 3 according to the third embodiment of the present disclosure will be described subsequently.

The operation principles of the semiconductor power converter control unit 38 and the switch control unit 39 are similar to those of the semiconductor power converter control unit 15 and the switch control unit 16 in the first embodiment. In other words, the modulation wave d is determined based on equation (14), and the phase α is determined based on equation (13). When the triangular wave $v_{tri}$ is smaller than the modulation wave d determined based on equation (14), the switch control unit 39 controls the set of the first switch unit 31 and the third switch unit 36 to be ON and controls the set of the second switch unit 32 and the fourth switch unit 37 to be OFF. When the triangular wave $v_{tri}$ is larger than the modulation wave d determined based on equation (14), the switch control unit 39 controls the set of the first switch unit 31 and the third switch unit 36 to be OFF and controls the set of the second switch unit 32 and the fourth switch unit 37 to be ON. The switch control unit 39 performs switching from ON to OFF and switching from OFF to ON for each of the set of the first switch unit 31 and the third switch unit 36 and the set of the second switch unit 32 and the fourth switch unit 37, at the phases α and π–α in which the current output from the semiconductor power converter 33 is controlled to be zero by the semiconductor power converter control unit 38.

The above-mentioned method for determining the phase α assumes an ideal state in which each convener has zero loss. In the ideal state, when the phase of the current output from the semiconductor power converter 33 by the semiconductor power converter control unit 38 is α and π–α, this current output from the semiconductor power converter 33 is zero. In an actual chopper circuit 3, however, since each converter in the chopper circuit 3 has any loss, even when the phase of the current output from the semiconductor power converter 33 by the semiconductor power converter control unit 38 is α and π–α, this current output from the semiconductor power converter 33 is not zero, and a minute current flows. In view of this, the switch control unit 39 performs switching from ON to OFF and switching from OFF to ON for each of the set of the first switch unit 31 and the third switch unit 36 and the set of the second switch unit 32 and the fourth switch unit 37, at the phases α and π–α in which the current output from the semiconductor power converter 33 is controlled to be equal to or lower than a predetermined value by the semiconductor power converter control unit 38. The predetermined value means herein a value sufficiently smaller than the rated current of the semiconductor power converter 33. As one example, the predetermined value is set to a value of, e.g., about 0% to 10% of the rated current of the semiconductor power converter 33, but it may be set to a value larger than 10% of the rated current of the semiconductor power converter 33, depending on the environment under which the chopper circuit 3 is applied.

The chopper circuit 3 according to the third embodiment can bidirectionally convert a voltage between the first DC voltage $v_{dc1}$ across the pair of first external connection terminals $T_1$ and $G_1$ and the second DC voltage $v_{dc2}$ across the pair of second external connection terminals $T_2$ and $G_2$. In the chopper circuit 3 according to the third embodiment, however, a voltage can be bidirectionally converted between the first DC voltage $v_{dc1}$ and the second DC voltage $v_{dc2}$ regardless of the relationship in value between the first DC voltage $v_{dc1}$ and the second DC voltage $v_{dc2}$.

A simulation result for a chopper circuit system 1000 including three chopper circuits 3 (Number of Units M=3) will be described subsequently.

As illustrated in FIG. 20, the chopper circuit system 1000 is formed by chopper circuits 3 connected in parallel with each other. The number of chopper circuits 3 is represented by the number of units M (where M is a natural number), and the respective chopper circuits 3 are represented as a first unit, a second unit, . . . , an Mth unit. Each unit (chopper circuit 3) is connected in parallel with a common DC power supply $v_{dc1}$ on the first DC voltage side, and connected in parallel with a common DC power supply $v_{dc2}$ on the second DC voltage side. The triangular wave initial phases of the first main power converter 30 and the second main power converter 35 in each unit are shifted by 180/M degrees for each unit. The phase of each inductor current $i_U$ is similarly shifted by 180/M degrees.

FIG. 26 is a table illustrating circuit constants used for simulation of a chopper circuit system formed by three parallel-connected chopper circuits according to the third embodiment of the present disclosure, in which the simulation used "PSCAD/EMTDC." The number of units M of the chopper circuit system 1000 was three, and the number (the number of chopper cells) N of semiconductor power converters 33 provided in the chopper circuit 3 serving as each unit was set to three. The first DC voltage $v_{dc1}$ was set to 1.5 [kV], the second DC voltage $v_{dc2}$ was set to 0.75 [kV], and the DC capacitor voltage $V_C$ of the capacitor in each semiconductor power converter 33 (chopper cell) was set to 0.6 [kV]. The carrier frequency $f_{SM}$ of the main power converter 10 in each unit was set to 450 [Hz], and the carrier frequency $f_{SA}$ of the auxiliary power converter 40 was set to 10 [kHz]. Since phase shift PWM is applied to each chopper cell, the equivalent carrier frequency of the auxiliary power converter 40 is 30 [kHz] (=$Nf_{SA}$). This simulation aims to confirm the principle, and therefore assumes an ideal state. In other words, assuming an analog control system having zero control delay, ideal switches having zero dead time were used.

Figure 27:
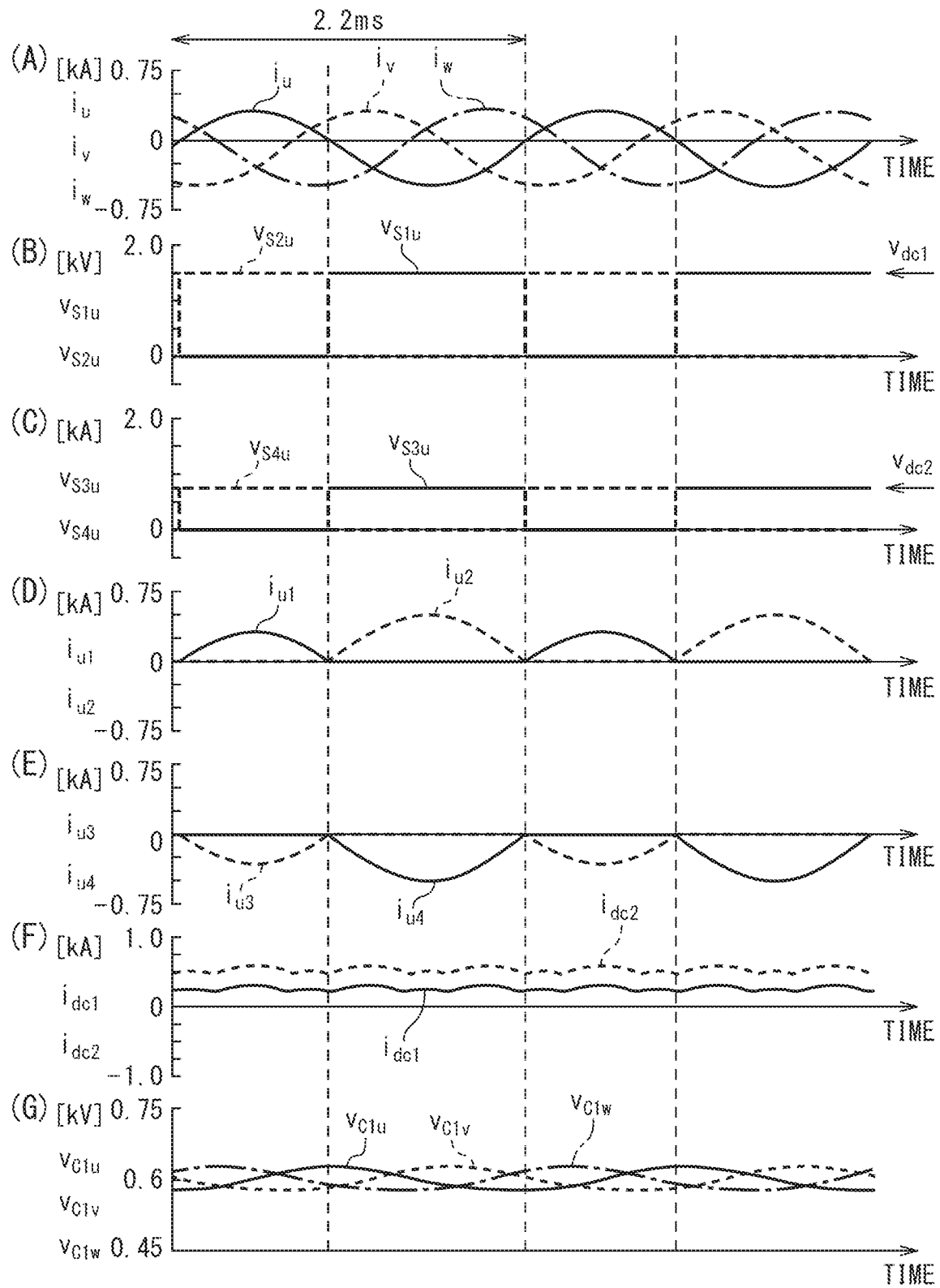
FIG. 27 illustrates graphs of simulated waveforms when a power of 400 [kW] is transmitted from a first DC voltage side to a second DC voltage side in the chopper circuit system formed by the three parallel-connected chopper circuits according to the third embodiment of the present disclosure, and depicts in (A), inductor currents for respective units; in (B), voltages respectively appearing across the two ends of a first switch unit and the two ends of a second switch unit in a first unit; in (C), voltages respectively appearing across the two ends of a third switch unit and the two ends of a fourth switch unit in the first unit; in (D), currents respectively flowing through the first switch unit and the second switch unit in the first unit; in (E), currents respectively flowing through the third switch unit and the fourth switch unit in the first unit; in (F), currents respectively flowing on the first DC voltage side and the second DC voltage side in the chopper circuit system; and in (G), DC capacitor voltages for capacitors in semiconductor power converters (chopper cells).
Figure 28:
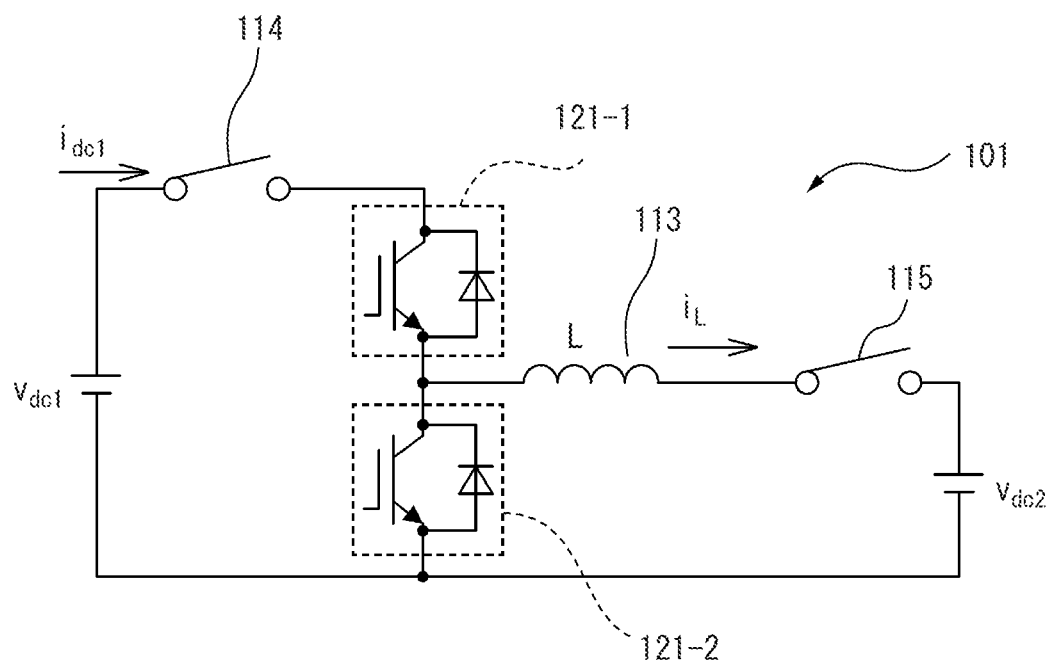
FIG. 28 is a circuit diagram illustrating a general bidirectional chopper circuit.

FIG. 27 illustrates graphs of simulated waveforms when a power of 400 [kW] is transmitted from a first DC voltage side to a second DC voltage side in the chopper circuit system formed by the three parallel-connected chopper circuits according to the third embodiment of the present disclosure, and depicts in (A), inductor currents for respective units; in (B), voltages respectively appearing across the two ends of a first switch unit and the two ends of a second switch unit in a first unit; in (C), voltages respectively appearing across the two ends of a third switch unit and the two ends of a fourth switch unit in the first unit; in (D), currents respectively flowing through the first switch unit and the second switch unit in the first unit; in (E), currents respectively flowing through the third switch unit and the fourth switch unit in the first unit; in (F), currents respectively flowing on the first DC voltage side and the second DC voltage side in the chopper circuit system; and in (G), DC capacitor voltages for capacitors in semiconductor power converters (chopper cells).

With attention being focused on inductor currents $i_u$, $i_v$, and $i_w$ illustrated in FIG. 27(A), a negative DC current is obviously superimposed on an AC component having a frequency of 450 [Hz]. The AC component having a frequency of 450 [Hz] has a sinusoidal waveform, and contains little harmonic current. With attention being focused on voltages (semiconductor valve device forward voltages) $v_{S1u}$, $v_{S2u}$, $v_{S3u}$, and $v_{S4u}$ respectively appearing across the two ends of the first switch unit 31, the two ends of the second switch unit 32, the two ends of the third switch unit 36, and the two ends of the fourth switch unit 37 in the first unit illustrated in FIGS. 27(B) and 27(C), when $v_{S1u}=v_{S3u}=0$, i.e., when the set of the first switch unit 31 and the third switch unit 36 is ON, the current $i_{u1}$ flowing through the first switch unit 31 and the current $i_{u3}$ flowing through the third switch unit 36 are "$i_{u1}=-i_{u3}=i_u$," as illustrated in FIGS. 27(D) and 27(E), and the voltage $v_{S2u}$ appearing across the two ends of the second switch unit 32 and the voltage $v_{S4u}$ appearing across the two ends of the fourth switch unit 37 are "$v_{S2u}=v_{dc1}=1.5$ [kV]" and "$v_{S4u}=v_{dc2}=0.75$ [kV]," as illustrated in FIGS. 27(B) and 27(C). When "$v_{S2u}=v_{S4u}=0$ [V]," i.e., when the set of the second switch unit 32 and the fourth switch unit 37 is ON, the current $i_{u2}$ flowing through the second switch unit 32 and the current $i_{u4}$ flowing through the fourth switch unit 37 are "$-i_{u2}=i_{u4}=i_u$," as illustrated in FIGS. 27(D) and 27(E), and the voltage $v_{S1u}$ appearing across the two ends of the first switch unit 31 and the voltage $v_{S3u}$ appearing across the two ends of the third switch unit 36 are "$v_{S1u}=v_{dc1}=1.5$ [kV]" and "$v_{S3u}=v_{dc2}=0.75$ [kV]," as illustrated in FIGS. 27(B) and 27(C). This simulation result reveals that giving the modulation factor d presented in equation (14) makes it possible to implement soft switching operations (i.e., switching operations at the timings at which the flowing currents are kept equal to or lower than a very small predetermined value (e.g., zero)) for both the turn-off times and the turn-on times in the first switch unit 31, the second switch unit 32, the third switch unit 36, and the fourth switch unit 37. Hence, no switching losses occur in the first switch unit 31, the second switch unit 32, the third switch unit 36, and the fourth switch unit 37.

With attention being focused on the current $i_{dc1}$ flowing on the side of the first DC voltage $v_{dc1}$ and the current $i_{dc2}$ flowing on the side of the second DC voltage $v_{dc2}$ in the chopper circuit system 1000 illustrated in FIG. 27(F), summation of the individual currents of the chopper circuit 3 of the first unit, the chopper circuit 3 of the second unit, and the chopper circuit 3 of the third unit obviously brings the currents $i_{dc1}$ and $i_{dc2}$ closer to DC currents, compared to the DC current of only one chopper circuit 3 used alone. Obviously as well, a stepwise change in current occurring in the conventional chopper circuit does not occur in the chopper circuit system 1000. Therefore, no overvoltages resulting from the stepwise current occur in the chopper circuit system 1000.

Again, obviously, each of the DC capacitor voltages $v_{C1u}$, $v_{C1v}$, and $v_{C1w}$ of the capacitors in the semiconductor power converters 33 (chopper cells) illustrated in FIG. 27(G) contains DC and AC components, and the DC component of these components satisfactorily follows 600 [V] that is the command value. Again, obviously, as for the AC component, an AC component having a frequency of 450 [Hz] is present, but its magnitude is sufficiently lower than that of the DC component.

REFERENCE SIGNS LIST

1 Chopper circuit
2 Chopper circuit
3 Chopper circuit
10 Main power converter
11, 11-1, 11-2 First switch unit
12, 12-1, 12-2 Second switch unit
13 Semiconductor power converter
14 Inductor
15 Semiconductor power converter control unit
16 Switch control unit
1 Auxiliary power converter
20 Main power converter
21 First switch unit
22 Second switch unit
23 Third switch unit
24 Fourth switch unit
25 Semiconductor power converter
26 Inductor
27 Semiconductor power converter control unit
28 Switch control unit
29 Auxiliary power converter
30 First main power converter
31 First switch unit
32 Second switch unit
33 Semiconductor power converter
34 Inductor
35 Second main power converter
36 Third switch unit
37 Fourth switch unit
38 Semiconductor power converter control unit
39 Switch control unit
40 Auxiliary power converter
101 Bidirectional chopper circuit
113 Inductor
114 DC circuit breaker
115 DC circuit breaker
131 DC/DC converter
132 Capacitor
1000 Chopper circuit system

The invention claimed is:

1. A chopper circuit which converts a voltage between a first direct-current voltage on a first external connection terminal and a second direct-current voltage on a second external connection terminal, the circuit comprising:
a first switch unit including the first external connection terminal;
a second switch unit connected in series with the first switch unit to conduct electricity in a direction identical to the direction in which the first switch unit conducts electricity in an ON state, and including a second external connection terminal on a side opposite to a side on which the first switch unit is connected to the second switch unit;
at least one semiconductor power converter comprising one of a single semiconductor power converter and a plurality of semiconductor power converters cascaded to each other, provided on wiring branching from wiring connecting the first switch unit to the second switch unit;
an inductor connected in series with the at least one semiconductor power converter, on the wiring branching from the wiring connecting the first switch unit to the second switch unit;
a semiconductor power converter control unit configured to control a power conversion operation of the at least one semiconductor power converter to output a current containing a direct-current component and an alternating-current component having a predetermined period; and
a switch control unit configured to control one of the first switch unit and the second switch unit to be ON and control the other switch unit to be OFF, the switch control unit being configured to perform switching from ON to OFF and switching from OFF to ON for the first switch unit and the second switch unit when a value of a current output from the at least one semiconductor power converter is controlled to be not more than a predetermined value by the semiconductor power converter control unit.

2. The chopper circuit according to claim 1, wherein the at least one semiconductor power converter circuit comprises a chopper cell formed by two series-connected semiconductor switches and a direct-current capacitor connected in parallel with the two semiconductor switches, and having, as an output terminal, each terminal of one semiconductor switch of the two semiconductor switches.

3. The chopper circuit according to claim 2, wherein each of the semiconductor switches comprises:
a semiconductor switching element configured to conduct a current in one direction in an ON state; and
a feedback diode connected in antiparallel with the semiconductor switching element.

4. A chopper circuit which converts a voltage between a first direct-current voltage on a first external connection terminal and a second direct-current voltage on a second external connection terminal, the circuit comprising:
a first switch unit including the first external connection terminal;
a second switch unit connected in series with the first switch unit to conduct electricity in a direction identical to the direction in which the first switch unit conducts electricity in an ON state, and including a second external connection terminal on a side opposite to a side on which the first switch unit is connected to the second switch unit;
at least one semiconductor power converter comprising one of a single semiconductor power converter and a plurality of semiconductor power converters cascaded to each other, provided on wiring branching from wiring connecting the first switch unit to the second switch unit; and
an inductor connected in series with the at least one semiconductor power converter, on wiring branching from wiring connecting the first switch unit to the second switch unit,
wherein the first switch unit comprises two first switch units, and the second switch unit comprises two second switch units.

5. The chopper circuit according to claim 4, further comprising:
a semiconductor power converter control unit configured to control a power conversion operation of the at least one semiconductor power converter to output a current containing a direct-current component and an alternating-current component having a predetermined period; and
a switch control unit configured to control one of the first switch unit and the second switch unit to be ON and control the other switch unit to be OFF, the switch control unit being configured to perform switching from ON to OFF and switching from OFF to ON for the first switch unit and the second switch unit when a value of a current output from the at least one semiconductor power converter is controlled to be not more than a predetermined value by the semiconductor power converter control unit.

6. The chopper circuit according to claim 4, wherein the at least one semiconductor power converter circuit comprises a chopper cell formed by two series-connected semiconductor switches and a direct-current capacitor connected in parallel with the two semiconductor switches, and having, as an output terminal, each terminal of one semiconductor switch of the two semiconductor switches.

7. A chopper circuit which converts a voltage between a first direct-current voltage across a pair of first external connection terminals and a second direct-current voltage across a pair of second external connection terminals, the circuit comprising:
a first switch unit, a second switch unit, a third switch unit, and a fourth switch unit connected in series with each other to conduct electricity in an identical direction in an ON state;
at least one semiconductor power converter comprising one of a single semiconductor power converter and a plurality of semiconductor power converters cascaded to each other, provided on wiring connecting a connection point between the first switch unit and the second switch unit to a connection point between the third switch unit and the fourth switch unit;
an inductor connected in series with the at least one semiconductor power converter, on wiring connecting a connection point between the first switch unit and the second switch unit to a connection point between the third switch unit and the fourth switch unit;
a semiconductor power converter control unit configured to control a power conversion operation of the at least one semiconductor power converter to output a current containing a direct-current component and an alternating-current component having a predetermined period; and
a switch control unit configured to control one of a set of the first switch unit and the third switch unit and a set of the second switch unit and the fourth switch unit to be ON and control the other set of switch units to be OFF, the switch control unit being configured to perform switching from ON to OFF and switching from OFF to ON for each of a set of the first switch unit and the third switch unit and a set of the second switch unit and the fourth switch unit when a value of a current output from the at least one semiconductor power converter is controlled to be not more than a predetermined value by the semiconductor power converter control unit, wherein
a terminal on a side opposite to a side on which the first switch unit is connected to the second switch unit, and a terminal on a side opposite to a side on which the third switch unit is connected to the fourth switch unit are provided as the pair of first external connection terminals, and
a terminal on a side on which the second switch unit is connected to the third switch unit, and a terminal on a side of the fourth switch unit opposite to a side of the fourth switch unit on which the third switch unit is connected to the fourth switch unit are provided as the pair of second external connection terminals.

8. The chopper circuit according to claim 7, wherein the at least one semiconductor power converter circuit comprises a chopper cell formed by two series-connected semiconductor switches and a direct-current capacitor connected in parallel with the two semiconductor switches, and having, as an output terminal, each terminal of one semiconductor switch of the two semiconductor switches.

9. A chopper circuit which converts a voltage between a first direct-current voltage across a pair of first external connection terminals and a second direct-current voltage across a pair of second external connection terminals, the circuit comprising:
a first main power converter comprising a first switch unit and a second switch unit which are connected in series with each other to conduct electricity in an identical direction in an ON state, and one of which is turned on when the other switch unit is turned off, the first main power converter having, as the pair of first external connection terminals, two side terminals on a side opposite to a side on which the first switch unit is connected to the second switch unit;
at least one semiconductor power converter comprising one of a single semiconductor power converter and a plurality of semiconductor power converters cascaded to each other, provided on wiring branching from wiring connecting the first switch unit to the second switch unit;
an inductor connected in series with the at least one semiconductor power converter, on wiring branching from wiring connecting the first switch unit to the second switch unit;
a second main power converter comprising a third switch unit and a fourth switch unit which are connected in series with each other to conduct electricity in an identical direction in an ON state, and one of which is turned on when the other switch unit is turned off, the second main power converter having, as the pair of second external connection terminals, two side terminals on a side opposite to a side on which the third switch unit is connected to the fourth switch unit;
a semiconductor power converter control unit configured to control a power conversion operation of the at least one semiconductor power converter to output a current containing a direct-current component and an alternating-current component having a predetermined period; and
a switch control unit configured to control one of a set of the first switch unit and the third switch unit and a set of the second switch unit and the fourth switch unit to be ON and control the other set of switch units to be OFF, the switch control unit being configured to perform switching from ON to OFF and switching from OFF to ON for each of a set of the first switch unit and the third switch unit and a set of the second switch unit and the fourth switch unit when a value of a current output from the at least one semiconductor power converter is controlled to be not more than a predetermined value by the semiconductor power converter control unit,
wherein wiring that branches from wiring connecting the first switch unit to the second switch unit, and is provided with the at least one semiconductor power converter and the inductor is connected to a connection point between the third switch unit and the fourth switch unit.

10. The chopper circuit according to claim 9, wherein the at least one semiconductor power converter circuit comprises a chopper cell formed by two series-connected semiconductor switches and a direct-current capacitor connected in parallel with the two semiconductor switches, and having, as an output terminal, each terminal of one semiconductor switch of the two semiconductor switches.

\* \* \* \* \*